US012602797B2

(12) United States Patent
Okur et al.

(10) Patent No.: US 12,602,797 B2
(45) Date of Patent: Apr. 14, 2026

(54) RECONSTRUCTION OF BODY MOTION USING A CAMERA SYSTEM CAMERA SYSTEM FOR RECONSTRUCTION OF BODY MOTION BASED ON 3D JOINT HEAT MAP

(71) Applicant: RAPSODO PTE. LTD., Singapore (SG)

(72) Inventors: Batuhan Okur, Singapore (SG); Volkan Doğan, Izmir (TR)

(73) Assignee: Rapsodo Pte. Ltd., Singapore (SG)

( * ) Notice: Subject to any disclaimer, the term of this patent is extended or adjusted under 35 U.S.C. 154(b) by 386 days.

(21) Appl. No.: 18/498,864

(22) Filed: Oct. 31, 2023

(65) Prior Publication Data

US 2025/0139794 A1    May 1, 2025

(51) Int. Cl.
*G06T 7/246* (2017.01)
*G06T 7/215* (2017.01)
(Continued)

(52) U.S. Cl.
CPC .............. *G06T 7/251* (2017.01); *G06T 7/215* (2017.01); *G06T 7/292* (2017.01);
(Continued)

(58) Field of Classification Search
CPC .......... G06T 7/292; G06T 2207/10016; G06T 2207/20084; G06T 2207/30221;
(Continued)

(56) References Cited

U.S. PATENT DOCUMENTS 10,853,970 B1 * 12/2020 Akbas .................... G06T 1/0007
11,625,838 B1 * 4/2023 Narapureddy ....... G06V 10/454
382/103
(Continued)

FOREIGN PATENT DOCUMENTS

WO    WO-2023027691 A1 *    3/2023    ............. G06N 3/045

OTHER PUBLICATIONS

A. Zimmer, A. Hilsmann, W. Morgenstern and P. Eisert, "Imposing temporal consistency on deep monocular body shape and pose estimation," in Computational Visual Media, vol. 9, No. 1, pp. 123-139, Mar. 2023, doi: 10.1007/s41095-022-0272-x. (Year: 2023).*
(Continued)

*Primary Examiner* — Michael Robert Cammarata
(74) *Attorney, Agent, or Firm* — Fish & Richardson P.C.

(57) ABSTRACT

A method may include collecting first and second image data of an object motion, the first and second image data respectively including first and second frames captured by a first and a second camera. The method may include identifying an object included in the first and second frames and modeling two-dimensional pose estimations of the object for each identified frame. The two-dimensional pose estimations may indicate coordinate positions of the object features that contribute to the object motion. The method may include generating a first and a second three-dimensional joint heatmap corresponding to the object identified in the first and second frames based on features indicated in the two-dimensional pose estimations. The method may include determining a time delay between the first and second cameras based on the three-dimensional joint heatmaps and generating a motion journal that summarizes the motion associated with the object based on the time delay.

20 Claims, 15 Drawing Sheets

(51) Int. Cl.
*G06T 7/292* (2017.01)
*G06V 10/77* (2022.01)
*G06V 40/10* (2022.01)
*G06V 40/20* (2022.01)

(52) U.S. Cl.
CPC .......... *G06V 10/7715* (2022.01); *G06V 40/10* (2022.01); *G06V 40/23* (2022.01); *G06T 2207/20084* (2013.01)

(58) Field of Classification Search
CPC ..................... G06T 7/251; G06T 7/215; G06T 2207/30196; G06V 10/82; G06V 10/7715; G06V 40/10; G06V 40/23
See application file for complete search history.

(56) References Cited

U.S. PATENT DOCUMENTS

| | | | | |
|---|---|---|---|---|
| 11,783,613 | B1 * | 10/2023 | Guigues | G06T 7/292 382/103 |
| 2022/0051020 | A1 * | 2/2022 | Jha | G06V 10/945 |
| 2022/0142514 | A1 * | 5/2022 | Kruszewski | A61B 5/7264 |
| 2022/0262013 | A1 * | 8/2022 | Decker | G06T 7/20 |
| 2023/0090947 | A1 * | 3/2023 | Chen | G06N 3/08 382/103 |
| 2023/0368415 | A1 * | 11/2023 | Suzuki | G06T 7/70 |
| 2024/0221312 | A1 * | 7/2024 | Newman | G06T 17/05 |
| 2025/0037482 | A1 * | 1/2025 | Siekmann | G06V 40/10 |

OTHER PUBLICATIONS

M. Vo, Y. Sheikh and S. G. Narasimhan, "Spatiotemporal Bundle Adjustment for Dynamic 3D Human Reconstruction in the Wild," in IEEE Transactions on Pattern Analysis and Machine Intelligence, vol. 44, No. 2, pp. 1066-1080, Feb. 1, 2022, doi: 10.1109/TPAMI. 2020.3012429. (Year: 2022).*

X. Wang, J. Shi, H. S. Park and Q. Wang, "Motion-Based Temporal Alignment of Independently Moving Cameras," in IEEE Transactions on Circuits and Systems for Video Technology, vol. 27, No. 11, pp. 2344-2354, Nov. 2017, doi: 10.1109/TCSVT.2016.2581659. (Year: 2017).*

Serrat, Joan, et al. "Synchronization of video sequences from free-moving cameras." Iberian Conference on Pattern Recognition and Image Analysis. Berlin, Heidelberg: Springer Berlin Heidelberg, 2007. (Year: 2007).*

Tu, et al.; VoxelPose: Towards Multi-Camera 3D Human Pose Estimation in Wild Environment; ECCV; 2020; 16 pgs (Year: 2020).*

* cited by examiner

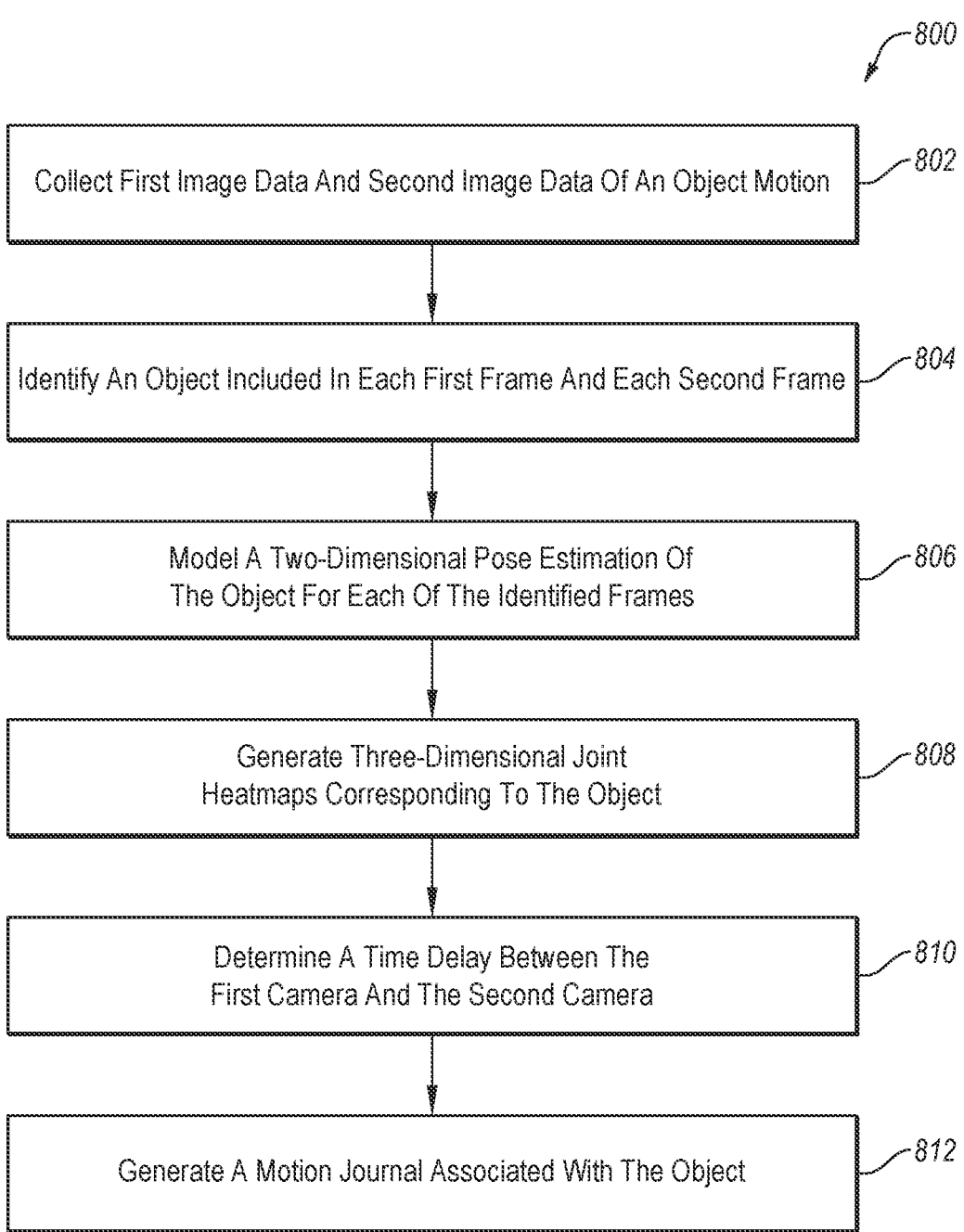

*800*

Collect First Image Data And Second Image Data Of An Object Motion — *802*

Identify An Object Included In Each First Frame And Each Second Frame — *804*

Model A Two-Dimensional Pose Estimation Of
The Object For Each Of The Identified Frames — *806*

Generate Three-Dimensional Joint
Heatmaps Corresponding To The Object — *808*

Determine A Time Delay Between The
First Camera And The Second Camera — *810*

Generate A Motion Journal Associated With The Object — *812*

*FIG. 8*

RECONSTRUCTION OF BODY MOTION USING A CAMERA SYSTEM CAMERA SYSTEM FOR RECONSTRUCTION OF BODY MOTION BASED ON 3D JOINT HEAT MAP

The present disclosure generally relates to reconstruction of body motion using a camera system.

BACKGROUND

People may move their bodies with large ranges of motion. The manner in which a person moves may be determined based on muscle movements and orientations of joints connecting different body parts. Evaluating muscle movement and conditions may improve understanding and analysis of human movement, such as in sports settings.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, a method may include collecting first image data and second image data of an object motion, the first image data including a plurality of first frames captured by a first camera and the second image data including a plurality of second frames captured by a second camera. The method may include identifying an object in each first frame of the plurality of first frames and each second frame of the plurality of second frames. The method may include modeling two-dimensional pose estimations of the object identified in each of the first frames and each of the second frames, the two-dimensional pose estimations indicating coordinate positions of one or more features of the object that contribute to the object motion. The method may include generating a first three-dimensional joint heatmap corresponding to the object identified in the plurality of first frames and a second three-dimensional joint heatmap corresponding to the object identified in the plurality of second frames in which the first and second three-dimensional joint heatmaps are generated from the features indicated in the two-dimensional pose estimations. The method may include determining a time delay between the first camera and the second camera based on the first three-dimensional joint heatmap and the second three-dimensional joint heatmap. The method may include generating a motion journal that summarizes the object motion associated with the object identified in the plurality of first frames and the plurality of second frames based on the time delay.

In some embodiments, the time delay between the first camera and the second camera may be determined by a neural network that is configured to generate a three-dimensional bounding box in which a volume included in the three-dimensional bounding box represents a region relevant for motion analysis and extract temporal features and spatial features corresponding to the first three-dimensional joint heatmap and the second three-dimensional joint heatmap within the three-dimensional bounding box. The neural network may be configured to shift the first three-dimensional joint heatmap relative to the second three-dimensional joint heatmap to align the spatial features extracted from both the first and the second three-dimensional joint heatmaps and compute the time delay based on shifting of the extracted temporal features. In some embodiments, shifting the first three-dimensional joint heatmap relative to the second three-dimensional joint heatmap may include calculating three-dimensional intersection over union (IoU) values between the first three-dimensional joint heatmap and the second three-dimensional joint heatmap. The time delay may be computed based on a maximum IoU value between the first three-dimensional joint heatmap and the second three-dimensional joint heatmap.

In some embodiments, the one or more features of the object that contribute to the object motion may be identified based on location differences of the one or more features between two or more frames of the first plurality of frames or of the second plurality of frames and distances between the one or more features remaining constant between the two or more frames.

In some embodiments, the first camera has a first frame capture rate and the second camera has a second frame capture rate that may be less than the first frame capture rate. The method may further include oversampling the second camera with respect to the first camera, the oversampling of the second camera resulting in a number of frames captured by the second camera being within a threshold value of the number of frames captured by the first camera in a same period of time.

In some embodiments, the motion journal includes x-values, y-values, z-values, and the time delay for each frame. The method may further include analyzing the motion journal to identify special events associated with the object motion.

In some embodiments, the object may be a human body and the first three-dimensional joint heatmap and the second three-dimensional joint heatmap relate to joints associated with the human body.

According to an aspect of an embodiment, a system may include one or more processors and one or more non-transitory computer-readable storage media that are configured to store instructions that, in response to being executed, cause the system to perform operations. The operations may include collecting first image data and second image data of an object motion, the first image data including a plurality of first frames captured by a first camera and the second image data including a plurality of second frames captured by a second camera. The operations may include identifying an object in each first frame of the plurality of first frames and each second frame of the plurality of second frames. The operations may include modeling two-dimensional pose estimations of the object identified in each of the first frames and each of the second frames, the two-dimensional pose estimations indicating coordinate positions of one or more features of the object that contribute to the object motion. The operations may include generating a first three-dimensional joint heatmap corresponding to the object identified in the plurality of first frames and a second three-dimensional joint heatmap corresponding to the object identified in the plurality of second frames in which the first and second three-dimensional joint heatmaps are generated from the features indicated in the two-dimensional pose estimations. The operations may include determining a time delay between the first camera and the second camera based on the first three-dimensional joint heatmap and the second three-dimensional joint heatmap. The operations may include generating a motion journal that summarizes the object motion associated with the object identified in the plurality of first frames and the plurality of second frames based on the time delay.

In some embodiments, the time delay between the first camera and the second camera may be determined by a neural network that is configured to generate a three-dimensional bounding box in which a volume included in the three-dimensional bounding box represents a region relevant for motion analysis and extract temporal features and spatial features corresponding to the first three-dimensional joint heatmap and the second three-dimensional joint heatmap within the three-dimensional bounding box. The neural network may be configured to shift the first three-dimensional joint heatmap relative to the second three-dimensional joint heatmap to align the spatial features extracted from both the first and the second three-dimensional joint heatmaps and compute the time delay based on shifting of the extracted temporal features. In some embodiments, shifting the first three-dimensional joint heatmap relative to the second three-dimensional joint heatmap may include calculating three-dimensional intersection over union (IoU) values between the first three-dimensional joint heatmap and the second three-dimensional joint heatmap. The time delay may be computed based on a maximum IoU value between the first three-dimensional joint heatmap and the second three-dimensional joint heatmap.

In some embodiments, the one or more features of the object that contribute to the object motion may be identified based on location differences of the one or more features between two or more frames of the first plurality of frames or of the second plurality of frames and distances between the one or more features remaining constant between the two or more frames.

In some embodiments, the first camera has a first frame capture rate and the second camera has a second frame capture rate that may be less than the first frame capture rate. The operations may further include oversampling the second camera with respect to the first camera, the oversampling of the second camera resulting in a number of frames captured by the second camera being within a threshold value of the number of frames captured by the first camera in a same period of time.

In some embodiments, the motion journal includes x-values, y-values, z-values, and the time delay for each frame. The operations may further include analyzing the motion journal to identify special events associated with the object motion.

In some embodiments, the object may be a human body and the first three-dimensional joint heatmap and the second three-dimensional joint heatmap relate to joints associated with the human body.

The object and advantages of the embodiments will be realized and achieved at least by the elements, features, and combinations particularly pointed out in the claims. It is to be understood that both the foregoing general description and the following detailed description are explanatory and are not restrictive of the invention, as claimed.

BRIEF DESCRIPTION OF THE DRAWINGS

Example embodiments will be described and explained with additional specificity and detail through the accompanying drawings in which:

FIG. 1 is a flowchart of an example body motion reconstruction process according to one or more embodiments of the present disclosure.

FIG. 8 is a flowchart of an example method of generating a motion journal analyzing a moving object according to at least one embodiment of the present disclosure.

DETAILED DESCRIPTION

Figure 2:
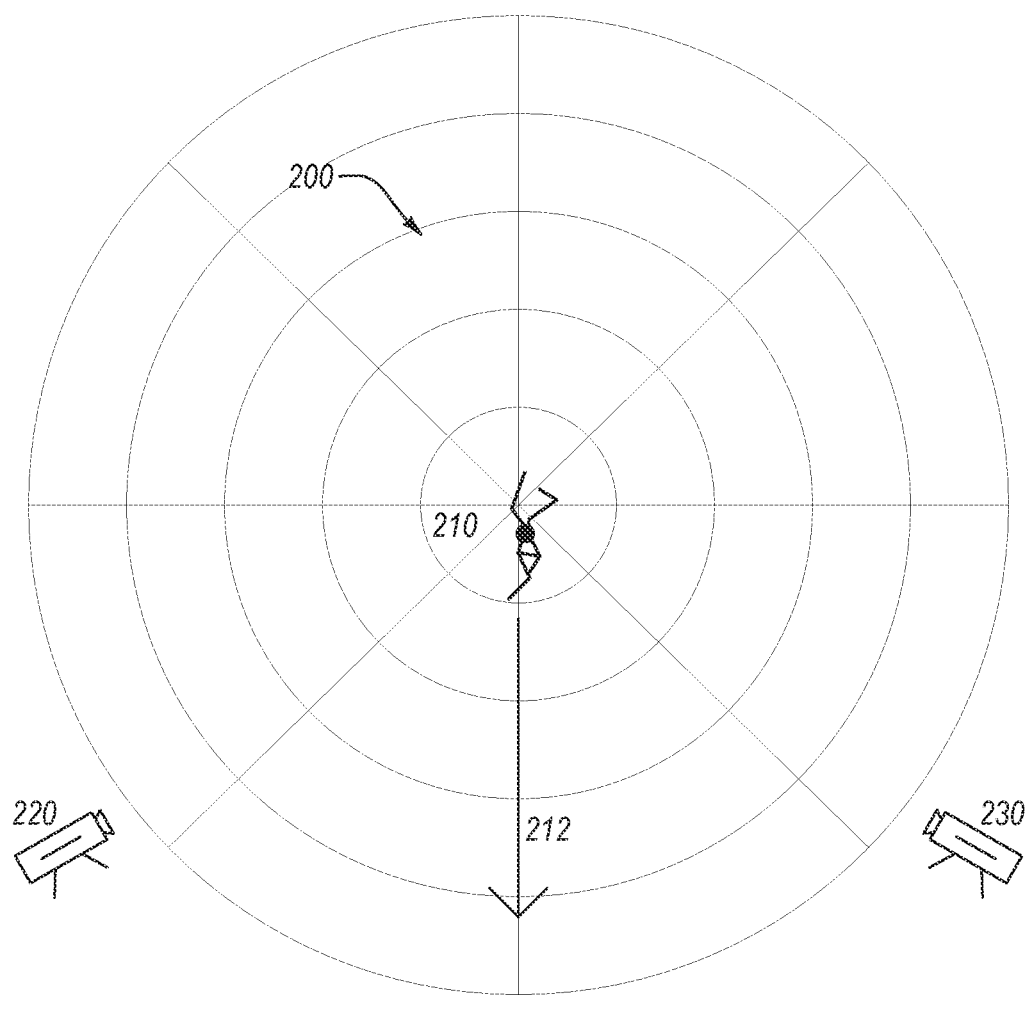
FIG. 2 illustrates a top-down view of an environment that implements a body motion reconstruction system according to one or more embodiments of the present disclosure.

Object motion, and in particular human body motion, may be captured by a camera system and analyzed using computer vision. Analysis of the object motion may provide insight regarding motion parameters associated with the object or facilitate motion prediction for the object. For some objects, such as human bodies, multiple different components associated with a given object may move concurrently. Accurately analyzing motion of the different components associated with the given object may be challenging. Disambiguating the motion of each component may be difficult because two or more components may be located in close proximity to one another. Furthermore, observation of a given component may be obscured by the movement of other components such that collection of motion data relating to the given component may be hindered. While using multiple sensors positioned at varying angles and distances from the given object may decrease occlusion of one or more of the components, synchronization of the different data streams may be imprecise due to the close proximity and the absence of distinct boundaries between the components (e.g., between different body parts or joints of a moving human body, especially with different articles of clothing worn by the human).

Some combinations of motions may correspond to known patterns of movement that include semantic meaning. For example, a given human body performing a sequence of movements that includes lifting an arm, straightening out the fingers corresponding to the lifted arm, and shaking the arm along a left-right axis may indicate that the given human body is performing a known pattern of movements that signifies hand-waving. Consequently, analysis of object motion may be useful in various contexts. In a sports setting, for example, human body motion analysis may facilitate identifying physical actions (e.g., pitching a ball, swinging a bat or club, follow-through for swinging motions, some combination thereof, or any other physical actions) or determining how well such physical actions were performed by the human body.

In a three-dimensional environment, complete or partial occlusion of the object from the perspective of one or more cameras may occur and prevent accurate capturing of motion data and analysis of the object motion. Such occlusion problems may be particularly prevalent in object motion reconstruction and analysis systems that implement multiple cameras that capture motion of the object from different perspectives because different viewpoints of a given object may involve varying obstructions in a line of sight between the camera and one or more key points associated with the object being observed.

Additionally or alternatively, multi-camera object motion reconstruction systems may be complex because synchronization of images captured by different cameras may be needed to accurately model three-dimensional motion of an observed object. Attempting to analyze object motion based on asynchronous images captured by the cameras used in the multi-camera object motion reconstruction system may result in inaccurate identification of key points associated with the observed object, poor synchronization between object images, or other object motion modeling problems. Existing multi-camera object motion reconstruction systems may solve the synchronization problem by individually calibrating the cameras used in the system. However, individual calibration of the cameras may be time-consuming and unwieldy because the cameras may need to be calibrated each time the multi-camera object motion reconstruction system is initialized.

The present disclosure relates to, among other things, a multi-camera object motion reconstruction system that may be implemented using a camera system comprising two or more cameras (i.e. a set of cameras). In some embodiments, the set of cameras may be a sparse set of asynchronous cameras. The asynchronous cameras used in relation to the multi-camera object motion reconstruction system may include differences in image-capture resolution, frame capture rate, shuttering speed, image processing latency, some combination thereof, or any other camera characteristics. Two-dimensional (2D) images of a given object captured by the multiple cameras used in the multi-camera object motion reconstruction system according to the present disclosure may be used to generate three-dimensional (3D) poses of the given object. The 3D poses of the given object may be analyzed to determine a time delay between two or more of the cameras including two or more of the asynchronous cameras. In some embodiments, the time delay between two or more of the asynchronous cameras allows images captured by each of the asynchronous cameras to be temporally aligned. In some embodiments, the temporally aligned images and the 3D poses of the given object may be combined to generate a motion journal that documents movement of the given object over a given period of time. Performing motion reconstruction and analysis according to the present disclosure may obviate the need to individually calibrate the cameras used to capture the motion data.

Furthermore, the number of cameras needed to accurately reconstruct the motion of one or more objects included in a given scene according to the present disclosure may advantageously be fewer than the number of cameras used in other existing multi-camera object motion reconstruction systems.

Embodiments of the present disclosure are explained with reference to the accompanying figures.

Figure 1:
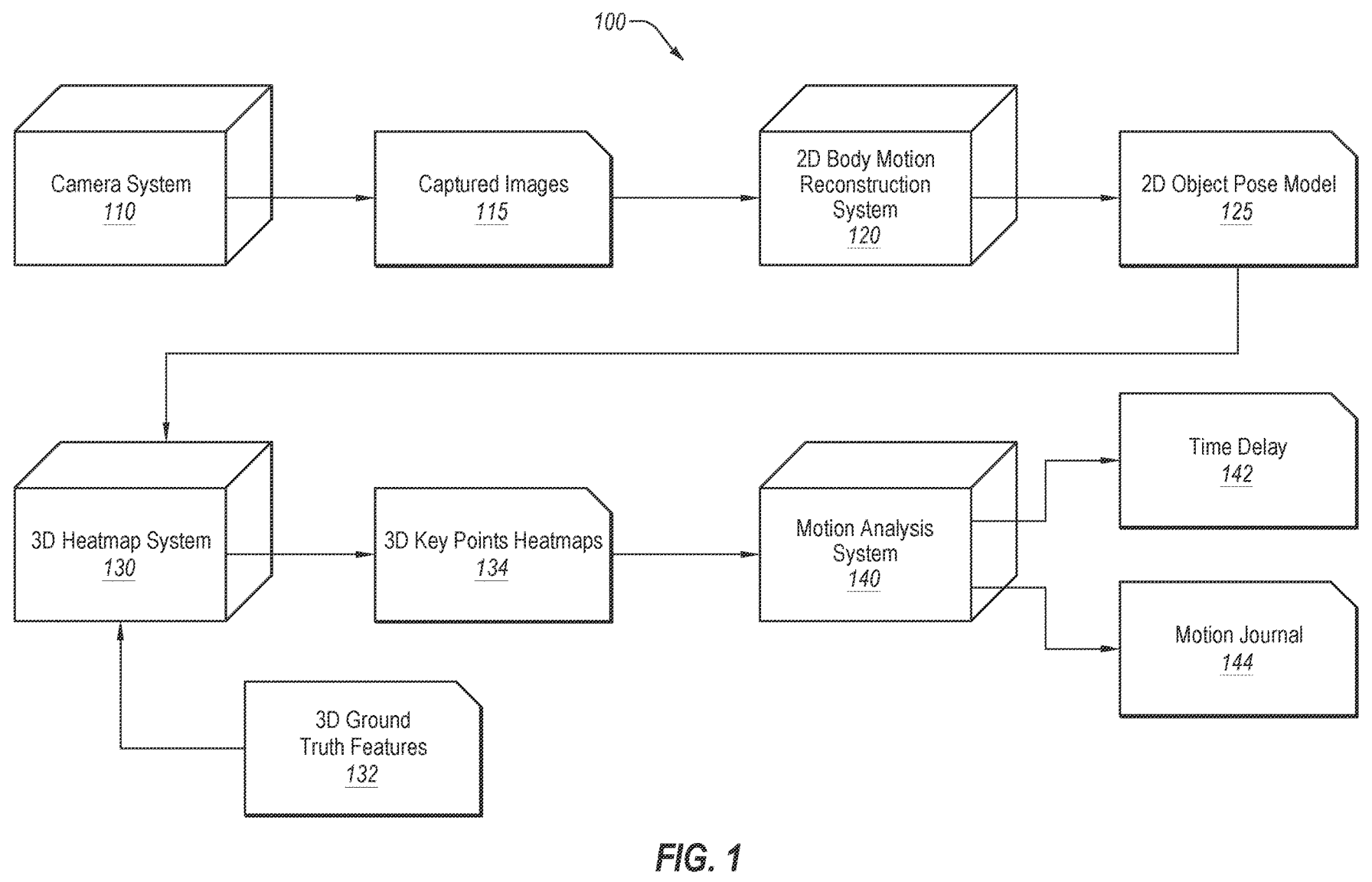

FIG. 1 is an example computing system 100 configured to perform a body motion reconstruction process according to one or more embodiments of the present disclosure. The system 100 may include a camera system 110, a 2D body motion reconstruction system 120, a 3D heatmap system 130, or a motion analysis system 140. Elements of the system 100, including, for example, the camera system 110, the 2D body motion reconstruction system 120, the 3D heatmap system 130, or the motion analysis system 140 (generally referred to as "computing modules"), may include code and routines configured to enable a computing system to perform one or more operations. Additionally or alternatively, the computing modules may be implemented using hardware including a processor, a microprocessor (e.g., to perform or control performance of one or more operations), a field-programmable gate array (FPGA), or an application-specific integrated circuit (ASIC). In some other instances, the computing modules may be implemented using a combination of hardware and software. In the present disclosure, operations described as being performed by the computing modules may include operations that the computing modules may direct one or more corresponding systems to perform. The computing modules may be configured to perform a series of operations with respect to captured images 115, 2D object pose models 125, 3D key points heatmaps 134, time delays 142, or motion journals 144 as described in further detail below in relation to method 800 of FIG. 8.

In some embodiments, the camera system 110 may include two or more cameras that are configured to capture images 115 of an environment that includes an object in motion. In some embodiments, the camera system 110 may include two, three, four, five or more cameras. Each of the cameras included in the camera system 110 may be positioned at different locations in the environment to facilitate capturing the images 115 from different perspectives so that the captured images 115 represent the object from different viewpoints. In some embodiments, for a camera system consisting of two cameras, the different locations of first and second cameras may be represented by an angle formed between the first and the second cameras with respect to the object. In such an embodiment, the angle may be in a range from about 30° to about 150° for example 30°, 45°, 60°, 70°, 80°, 90°, 100°, 110°, 120°, 130°, 140° or 150°. In some embodiments, the angle may be about 60° or more. In some embodiments, the angle may be about 60° to about 150°. For example, FIG. 2 illustrates a top-down view of an environment 200 that implements a body motion reconstruction system according to one or more embodiments of the present disclosure. The environment 200 may represent a sporting field with an object, such as a human 210, facing a given direction 212. The environment 200 may include a first camera 220 located at a first position and a second camera 230 located at a second position that gives the second camera 230 a different angle of viewing the human 210 relative to the first camera 220. The captured images 115 may include first images captured by the first camera 220 and second images captured by the second camera 230.

A camera included in the camera system 110 may include optical elements such as, for example, lenses, filters, holograms, splitters, or any other components, and an image sensor upon which an image may be recorded. Such a camera may include any device that converts an image represented by incident light into an electronic signal. The camera may include a plurality of pixel elements, which may be arranged in a pixel array (e.g., a grid of pixel elements); for example, the camera may comprise a charge-coupled device (CCD) or complementary metal-oxide-semiconductor (CMOS) image sensor. The pixel array may include a 2D array with an aspect ratio of 1:1, 4:3, 5:4, 3:2, 16:9, 10:7, 6:5, 9:4, 17:6, etc., or any other ratio. The camera may be optically aligned with various optical elements that focus light onto the pixel array, for example, a lens. Any number of pixels may be included such as, for example, eight megapixels, 15 megapixels, 20 megapixels, 50 megapixels, 100 megapixels, 200 megapixels, 600 megapixels, 1000 megapixels, etc. It is to be understood that any other number of pixels than shown above may be included as well.

Various other components may also be included in the camera. Such components may include one or more illuminating features such as a flash or other light source, a light diffuser, or other components for illuminating an object. In some embodiments, the illuminating features may be configured to illuminate the object being observed in the environment by the camera when the object is proximate the camera, for example, when the object is moving within three meters of the camera.

In some embodiments, each of the cameras included in the camera system 110 may be asynchronous in terms of camera specifications, timing of image capture, some combination thereof, or along any other camera characteristics or parameters. For example, a first camera included in the camera system 110 (e.g., the first camera 220) may be configured to operate at a frame rate of 50 frames per second (fps), while a second camera included in the camera system 110 (e.g., the second camera 230) may be configured to operate at a frame rate of 100 fps. In other words, the first camera may capture fifty images in a given second, and the second camera may capture one hundred images in the same given second. In this and other examples, the first camera and the second camera may initiate image capturing at different times, which may be caused by the first camera and the second camera having different initialization processes associated with the cameras, having different communication latencies to each of the cameras, receiving separate clock signals prompting the cameras to begin image capture, or for any other reasons. The first camera, for example, may begin capturing images 0.1 seconds, 0.2 seconds, 0.5 seconds, 1 second, 2 seconds, or any other time periods before the second camera begins capturing images. In some embodiments, the time periods before the second camera begins capturing images may be represented by a range, for example 0.1-0.2 seconds, 0.1-0.5 seconds, 0.1 seconds-1 second, 0.1-2 seconds, or 0.1-3 seconds.

The captured images 115 may be obtained by the 2D body motion reconstruction system 120. In some embodiments, the 2D body motion reconstruction system 120 may be configured to output one or more 2D object pose models 125 by processing the captured images 115. Processing the captured images 115 and generating the 2D object pose models 125 by the 2D body motion reconstruction system 120 may involve finding an observed object included in each image of the captured images 115 for one or more frames. In some embodiments, a machine-learning process may be implemented to recognize and find objects of interest to the 2D body motion reconstruction system 120. A convolutional neural network (CNN) model, for example, may be trained using a set of ground-truth training images to recognize various objects. The set of ground-truth training images may include depictions of humans such that the CNN model is trained to find humans included in the captured images 115. Additionally or alternatively, the CNN model may be trained to identify other objects corresponding to a relevant environment. For example, the set of ground-truth training images may include depictions of baseballs and baseball bats in situations in which the CNN model is intended to be implemented to identify captured images 115 relating to a baseball game. As an additional or alternative example, the set of ground-truth training images may include depictions of humans in different dancing poses and in different outfits such that the CNN model may be trained to identify humans in a dance environment in which the humans may be performing dance choreographies that may or may not be readily identifiable based on typical human movements or typical human clothing.

The 2D body motion reconstruction system 120 may be configured to identify a region of interest (ROI) with respect to each image included in the captured images 115 in which a given ROI indicates a subset area in a given captured image 115 that includes the object being observed. Processing the captured images 115 using the given ROI may decrease an amount of noisy data being analyzed by the 2D body motion reconstruction system 120 because extraneous areas included in the captured images 115 may be omitted from analysis. In some embodiments, the machine-learning process of the 2D body motion reconstruction system 120 may involve outlining the area of the given captured image 115 in which the object being observed is identified and indicating the subset area corresponding to the given ROI to include the outlined area. Additionally or alternatively, the subset area corresponding to the given ROI may include the outlined area of the object and an additional area around the outlined area.

In some embodiments, the 2D body motion reconstruction system 120 may be configured to find the object-of-interest and identify ROIs in only the first several frames (e.g., images) of the captured images 115. For example, the 2D body motion reconstruction system 120 may be configured to identify ROIs in the first frame, the first two frames, the first five frames, the first ten frames, the first twenty frames, or any other number of frames of the captured images 115. Decreasing the number of frames in which the object-of-interest is tracked or ROIs are identified may advantageously decrease the computational time and resources the 2D body motion reconstruction system 120 may take to initiate tracking of the object-of-interest. This is because changes in the motion of the object-of-interest between pairs of consecutive frames may be sufficiently incremental so that the 2D body motion reconstruction system 120 may identify the object-of-interest or set the ROI of a subsequent, second frame based on the identified object-of-interest or ROI set in a previous, first frame.

The 2D body motion reconstruction system 120 may be configured to estimate 2D object pose models 125 of the objects identified in and tracked through the captured images 115. In some embodiments, the 2D body motion reconstruction system 120 may extract one or more features of the object-of-interest and determine the locations of the features relative to the captured images 115 from which the features were extracted using a coordinate system. The 2D body motion reconstruction system 120 may extract a given feature by tracking particular aspects of the object-of-interest as the object-of-interest moves over time as depicted in the captured images 115. The given feature may be identified by comparing the given feature to other possible features included in the captured images 115 and optionally comparing distances between the given feature and the other possible features. A constant or near-constant distance between the given feature and one or more other possible features may indicate that the given feature and the other features having constant distances to the given feature may represent fixed points of the object-of-interest that control or otherwise represent motion of the object. For example, joints in a human body may represent pivot points that control motion of the human body. While the human body is in motion, the distance between any two given connected joints may be constant. As such, the joints in the human body may be extracted as features by the 2D body motion reconstruction system 120.

Figure 3:
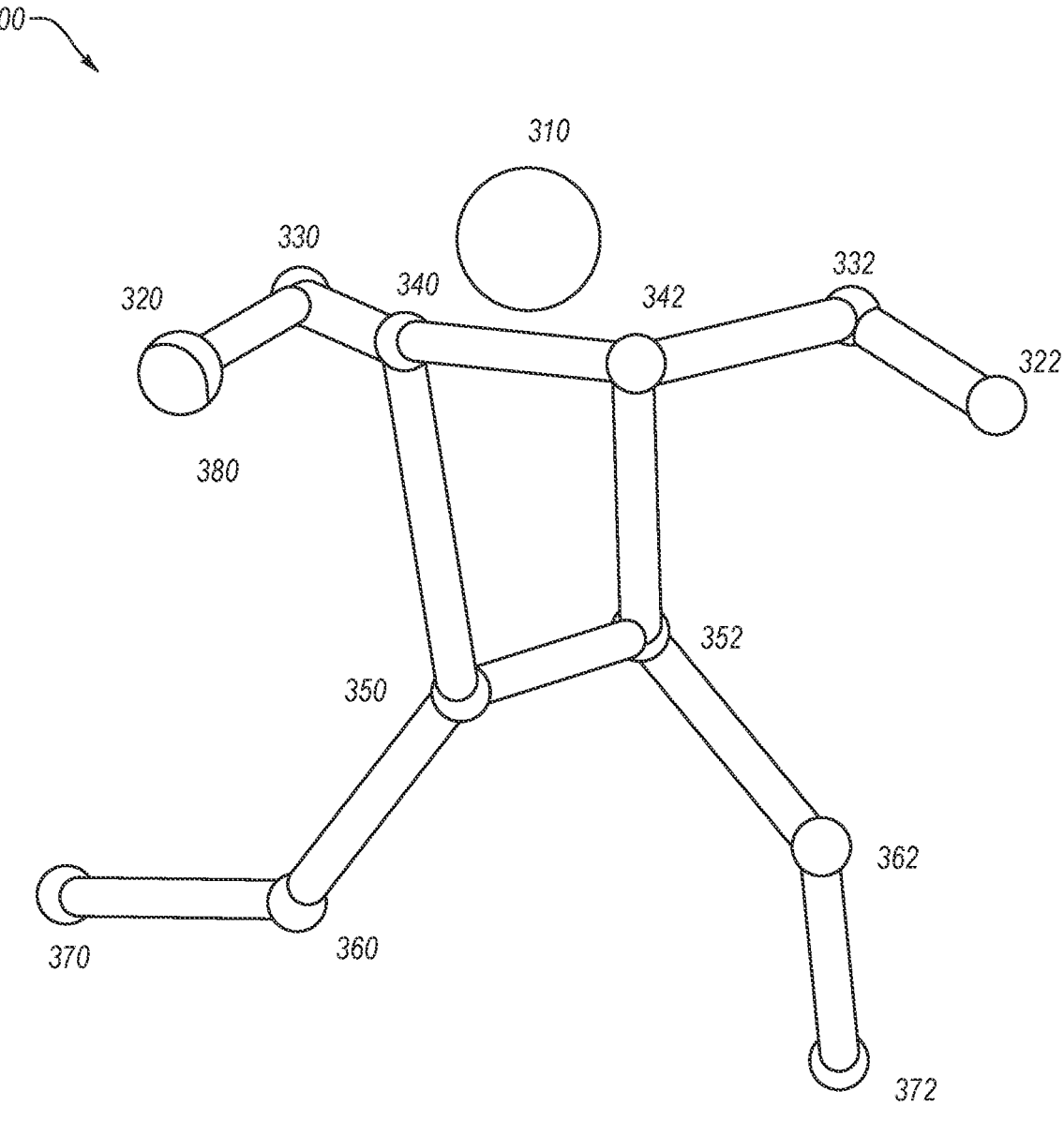
FIG. 3 illustrates a human body model associated with the body motion reconstruction system according to one or more embodiments of the present disclosure.

FIG. 3 illustrates a human body model 300 that may be output by the 2D body motion reconstruction system 120 according to one or more embodiments of the present disclosure. The human body model 300 may represent an object-of-interest included in an environment that implements the camera system 110, such as the environment 200 described in relation to FIG. 2. In some embodiments, the 2D body motion reconstruction system 120 may extract features that are expected to be associated with a human body. For example, the 2D body motion reconstruction system 120 may extract a head feature 310, a right wrist joint feature 320, a right elbow joint feature 330, a right shoulder joint feature 340, a right hip feature 350, a right knee joint feature 360, a right ankle joint feature 370, a left wrist joint feature 322, a left elbow joint feature 332, a left shoulder joint feature 342, a left hip feature 352, a left knee joint feature 362, and a left ankle joint feature 372 as depicted in the human body model 300.

Figure 4A:
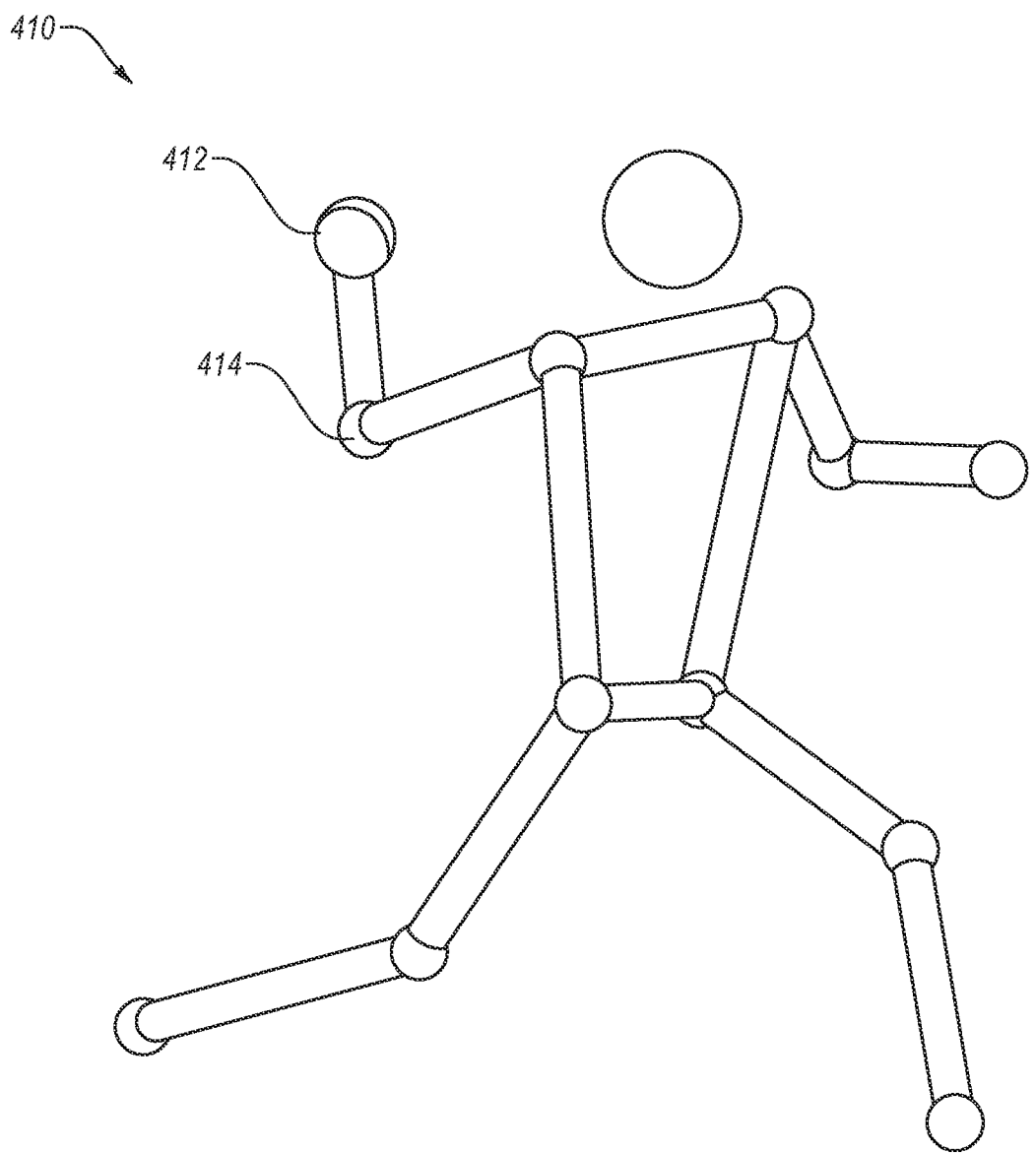
FIG. 4A illustrates the human body model in a first pose according to one or more embodiments of the present disclosure.
Figure 4B:
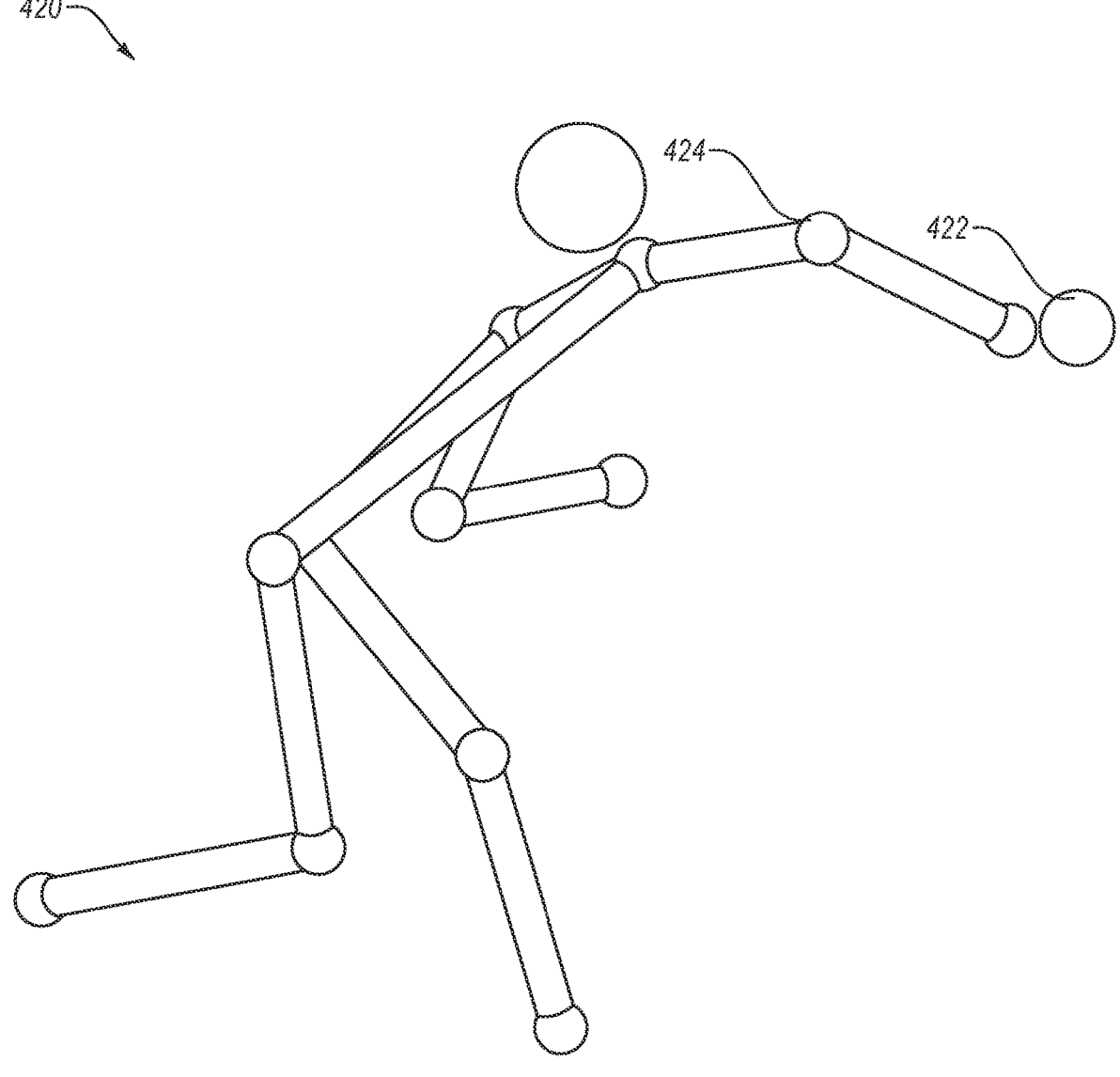
FIG. 4B illustrates the human body model in a second pose according to one or more embodiments of the present disclosure.
Figure 4C:
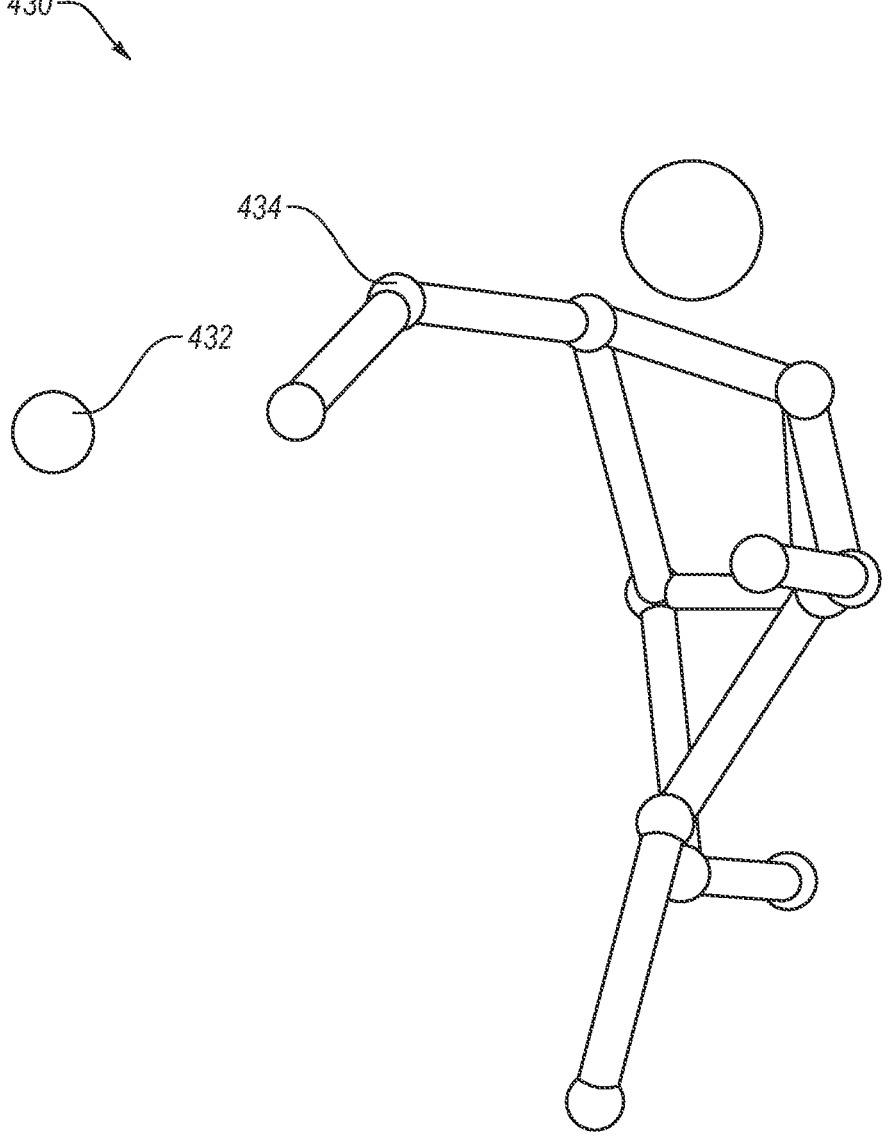
FIG. 4C illustrates the human body model in a third pose related to the second pose according to one or more embodiments of the present disclosure.

As additional or alternative examples, FIGS. 4A-4C illustrate examples of human body models in different poses. FIG. 4A illustrates the human body model in a first pose 410 according to one or more embodiments of the present disclosure. FIG. 4B illustrates the human body model in a second pose 420 according to one or more embodiments of the present disclosure. FIG. 4C illustrates the human body model in a third pose 430 related to the second pose 420 according to one or more embodiments of the present disclosure.

The human body model associated with the first pose 410 may include a first object 412 that is included in the image data associated with the human body model and one or more first joints 414 positioned at various locations on the human body model. In some embodiments, the first joints 414 may be the same as or similar to the head feature 310, the right wrist joint feature 320, the right elbow joint feature 330, the right shoulder joint feature 340, the right hip feature 350, the right knee joint feature 360, the right ankle joint feature 370, the left wrist joint feature 322, the left elbow joint feature 332, the left shoulder joint feature 342, the left hip feature 352, the left knee joint feature 362, or the left ankle joint feature 372 as depicted in the human body model 300 of FIG. 3.

In these and other embodiments, the human body model associated with the second pose 420 may include a second object 422 and one or more second joints 424. In some situations, the human body model associated with the second pose 420 may be a pose that occurs at an earlier time or a later time than the human body model associated with the first pose 410. For example, the second object 422 may be the same object as or a similar object to the first object 412 located in a different position in the same environment, and the second joints 424 may be the same as or similar to the first joints 414 but located in different positions. Additionally or alternatively, the human body model associated with the second pose 420 may be a pose that is unrelated to the human body model associated with the first pose 410.

The human body model associated with the third pose 430 may include a third object 432 and one or more third joints 434. The human body model associated with the third pose 430 may be a pose that occurs at an earlier time or a later time than the human body model associated with the first pose 410 or the human body model associated with the second pose 420. For example, the third object 432 may be the same object as or a similar object to the first object 412 or the second object 422 located in a different position in the same environment, and the third joints 434 may be the same as or similar to the first joints 414 or the second joints 424 but located in different positions. Additionally or alternatively, the human body model associated with the third pose 430 may be a pose that is unrelated to the human body model associated with the first pose 410 or the human body model associated with the second pose 420.

In some embodiments, for example in the system 100 described in FIG. 1, the 2D body motion reconstruction system 120 may be trained to extract features of the object-of-interest by using a machine-learning approach, such as with a CNN model. The CNN model may be trained in relation to particular object types so that the CNN model may identify and extract various features corresponding to each object type used to train the CNN model. For example, the CNN model may be trained using a set of images depicting humans with labeled points corresponding to the joints of the depicted humans in each image. Additionally or alternatively, other important features typically associated with humans may be labeled, such as heads, eyes, noses, mouths, body centers, or any other characteristics of human bodies. In some embodiments, the CNN model or other machine-learning system may identify 2D coordinates corresponding to each of the labeled features in the training dataset and be trained to identify 2D coordinates in similar objects identified in the captured images 115.

The 2D object pose models 125 estimated by the 2D body motion reconstruction system 120 may be sent to the 3D heatmap system 130. In some embodiments, the 3D heatmap system 130 may be configured to output 3D key point heatmaps 134. In some embodiments, the 3D heatmap system 130 may determine whether the cameras included in the camera system 110 are configured to capture images at the same image-capturing framerate. For example, the 3D heatmap system 130 may determine that a given first camera and a given second camera that both operate at a framerate of two hundred fps. Because the given first camera and the given second camera are configured to capture images at the same frequency, the images captured by the given first camera may be comparable to the images captured by the given second camera. Additionally or alternatively, the given first camera and the given second camera may include different rates of frame capture. For example, the first given camera may capture images at one hundred and ninety fps, while the given second camera captures images at two hundred fps. To synchronize image capture between the given first camera and the given second camera, the frame rate of the given first camera may be increased to two hundred fps by interpolating additional image captures by oversampling the images captured by the given first camera. As such, the given first camera and the given second camera may be compared as if both the given first camera and the given second camera include the same frame capture rate.

In this and other examples, the operation of the given first camera and the given second camera may be time-shifted such that the given first camera initiates image capturing before or after image capturing is initiated by the given second camera. Additionally or alternatively, the given first camera and the given second camera may be time-shifted such that given first camera terminates image capturing operations before or after the given second camera terminates image capturing operations. In situations in which the operations of the given first camera and the operations of the given second camera are time-shifted, the images captured by the given first camera and the images captured by the given second camera may be the same or similar with respect to the contents of the captured images but desynchronized with respect to the frame on which the images were captured. Turning to the previous example, a given first image may be captured on a tenth frame by the given first camera, and a given second image that is the same as or similar to the given first image may be captured on a first frame by the given second camera.

In some embodiments, the 3D heatmap system 130 may determine that the cameras included in the camera system 110 are not configured to capture images at the same image-capturing framerate. For example, a given first camera may operate at an image-capturing framerate of two hundred fps, while a given second camera may operate at an image-capturing framerate of one hundred fps. In this and other examples, the 3D heatmap system 130 may be configured to preprocess the images captured by the camera that includes a lower image-capturing framerate responsive to determining that two or more cameras included in the camera system 110 include different image-capturing framerates.

The preprocessing of the images captured by the lower-framerate camera may involve the 3D heatmap system 130 oversampling the images captured by the lower-framerate camera by a factor corresponding to the framerate of the higher-framerate camera. Turning to the previous example, the given second camera that includes a framerate of one hundred fps may be oversampled by a factor of two so that a length of data captured by the given first camera is equal to a length of data captured by the given second camera. In these and other embodiments, oversampling of the images captured by a given camera may involve interpolating and predicting a state of the environment corresponding to the images captured by the given camera at intermediate time points between the times at which the images were captured by the given camera. For example, a first image captured by a given camera may depict an object or a component of the object in a first position, and a second image captured by the given camera may depict the object or the component of the object in a second position. Interpolating between the first image and the second image may involve generating a third image that represents the environment, the object, the component of the object, or some combination thereof at a time between a first time corresponding to the first image and a second time corresponding to the second image. The interpolation may involve applying a Kalman filter, a linear regression, a nonlinear regression, a random sample consensus, a weighted average linear interpolation, spline interpolation, polynomial interpolation, nearest neighbor interpolation, Fourier (spectral) interpolation, or some combination thereof. It is to be understood that any other suitable predictive regression process with respect to the first image, the second image, and any other images that may provide information regarding the state of the environment at the point in time between the first time and the second time may also be used for the interpolation.

Figure 5A:
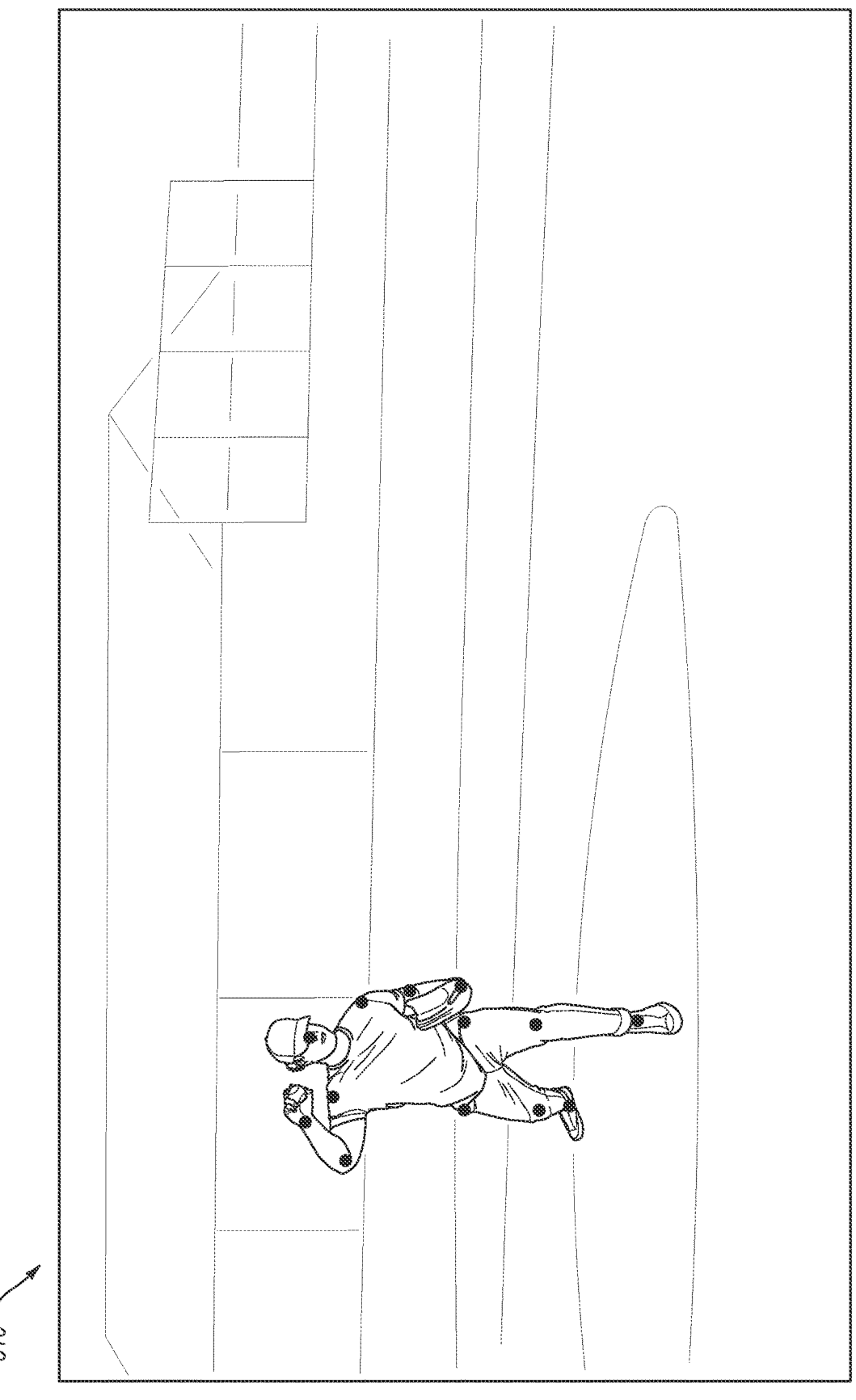
FIG. 5A is an example first frame of an environment captured by a first camera corresponding to the body motion reconstruction system according to one or more embodiments of the present disclosure.
Figure 5B:
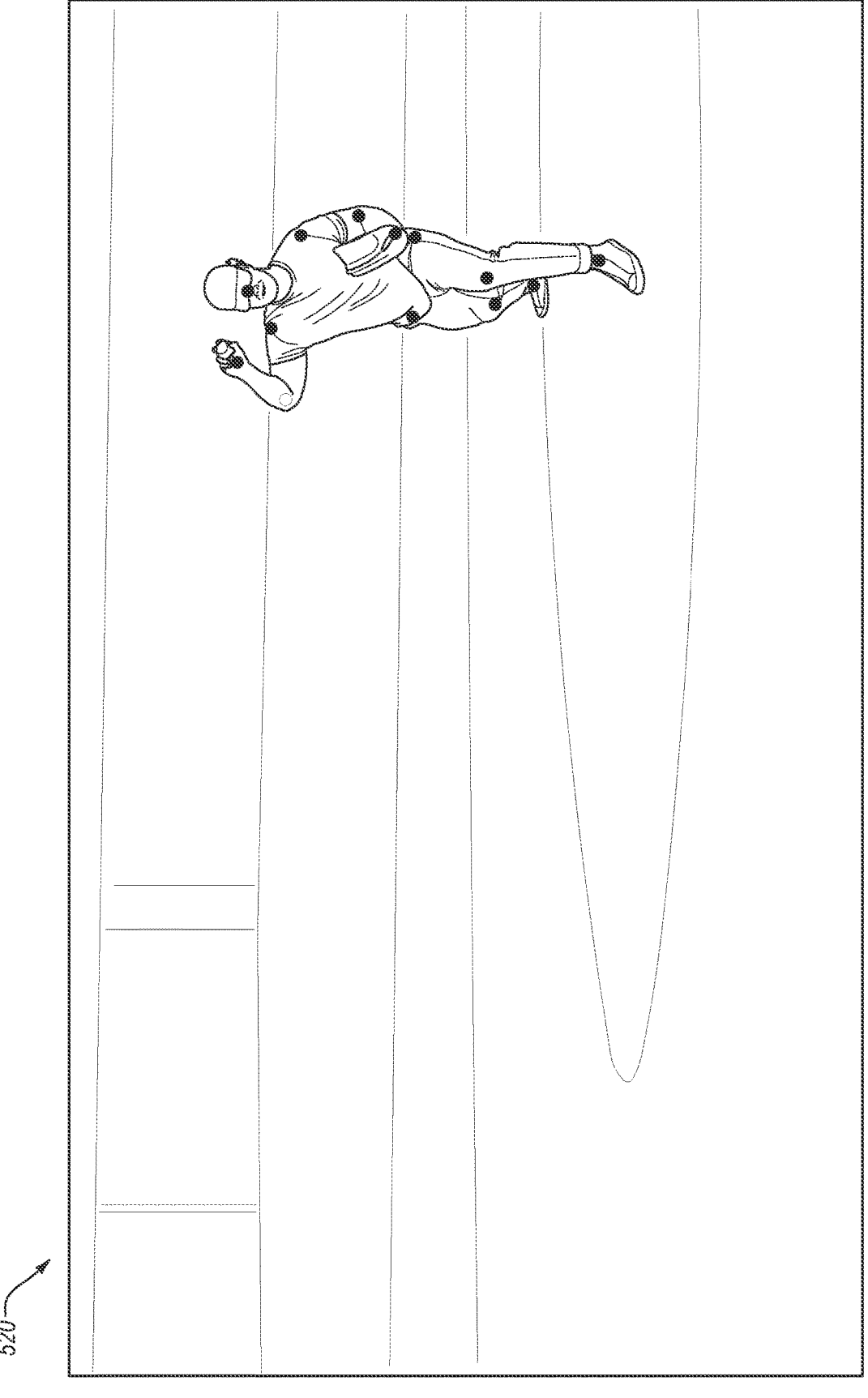
FIG. 5B is an example second frame of the environment captured by a second camera corresponding to the body motion reconstruction system according to one or more embodiments of the present disclosure.

Using the image data streams captured at or processed to have the same framerate, the 3D heatmap system 130 may be configured to generate the 3D key points heatmaps 134. In some embodiments, a given 3D key points heatmap 134 may include a representation of the environment, the ROI, or any other subset of the image that indicates a probability of a given feature being included in different regions of the environment or other subset of the environment. For example, FIGS. 5A and 5B are examples of a first frame 510 and a second frame 520 of an environment captured by a first camera and a second camera, respectively, corresponding to a given 3D key points heatmap. As illustrated in FIGS. 5A and 5B (together with FIG. 2), the first camera that captured the image corresponding to the first frame 510 may be positioned to capture images in a first region of the environment, and the second camera that captured the image corresponding to the second frame 520 may be positioned to capture images in a second region of the environment. Although the environment is illustrated as having two cameras, the environment may include one or more additional cameras positioned at locations different from the locations of the first camera and the second camera, such as a third camera positioned to capture images corresponding to a middle of the environment or a fourth camera positioned to capture images from an opposite side of the environment.

The first frame 510 and the second frame 520 may include depictions of an object-of-interest, such as a human being performing a given motion, and the 3D heatmap system 130 may be configured to indicate a probability of a 3D region of the environment including a feature associated with the object-of-interest, such as an elbow joint, a knee joint, a shoulder, a hand, a head, a nose, or any other motion-identifying feature of the human being. In some embodiments, the probability of a given 3D region of the environment including a feature may be represented by one or more colors, different gradients of shading, density of stippling markings, or any other visualizations of varying concentrations. As illustrated in FIGS. 5A and 5B, for example, the first frame 510 and the second frame 520 may include colors that indicate the probability of the feature being included at different 3D coordinates. Red markings may be used to indicate the most probable locations of the features, while yellow shading, green shading, blue shading, or any other indicators for classifying probabilities may be used to indicate different probabilities of the features being present in the respective locations.

In some embodiments, the 3D heatmap system 130 as described in FIG. 1 may be configured to compare 2D feature coordinates from the 2D object pose models 125 to one or more 3D ground truth features 132 with consideration for intrinsic properties and extrinsic properties of the cameras included in the camera system 110 to generate the 3D key points heatmaps 134. The 3D ground truth features 132 may include 3D coordinates that indicate the locations of the features of the object-of-interest collected from a ground truth environment. In some embodiments, the ground truth environment may include a testing environment that includes an object that is the same as or similar to the object-of-interest in the environment associated with the camera system 110. Additionally or alternatively, the object included in the testing environment may perform motions that are the same as or similar to the motions of the object-of-interest. In some embodiments, three-dimensional features of the object included in the testing environment may be identified using a multi-camera system, and the identified 3D features may be considered the 3D ground truth features 132. In some embodiments, the multi-camera system may be a synchronized multi-camera system.

Figure 5C:
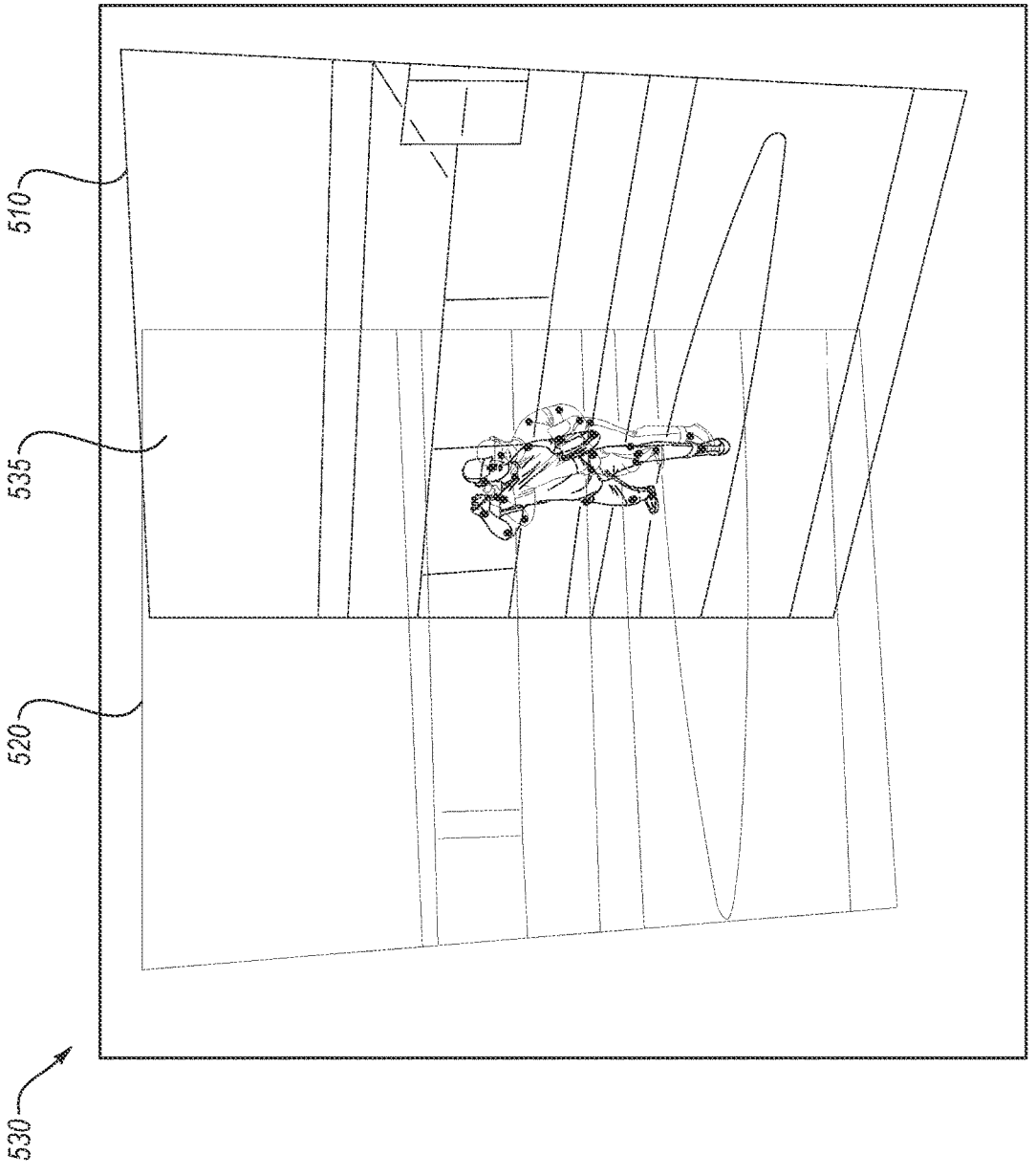
FIG. 5C illustrates a front view of an intersection of the first frame and the second frame according to one or more embodiments of the present disclosure.
Figure 5D:
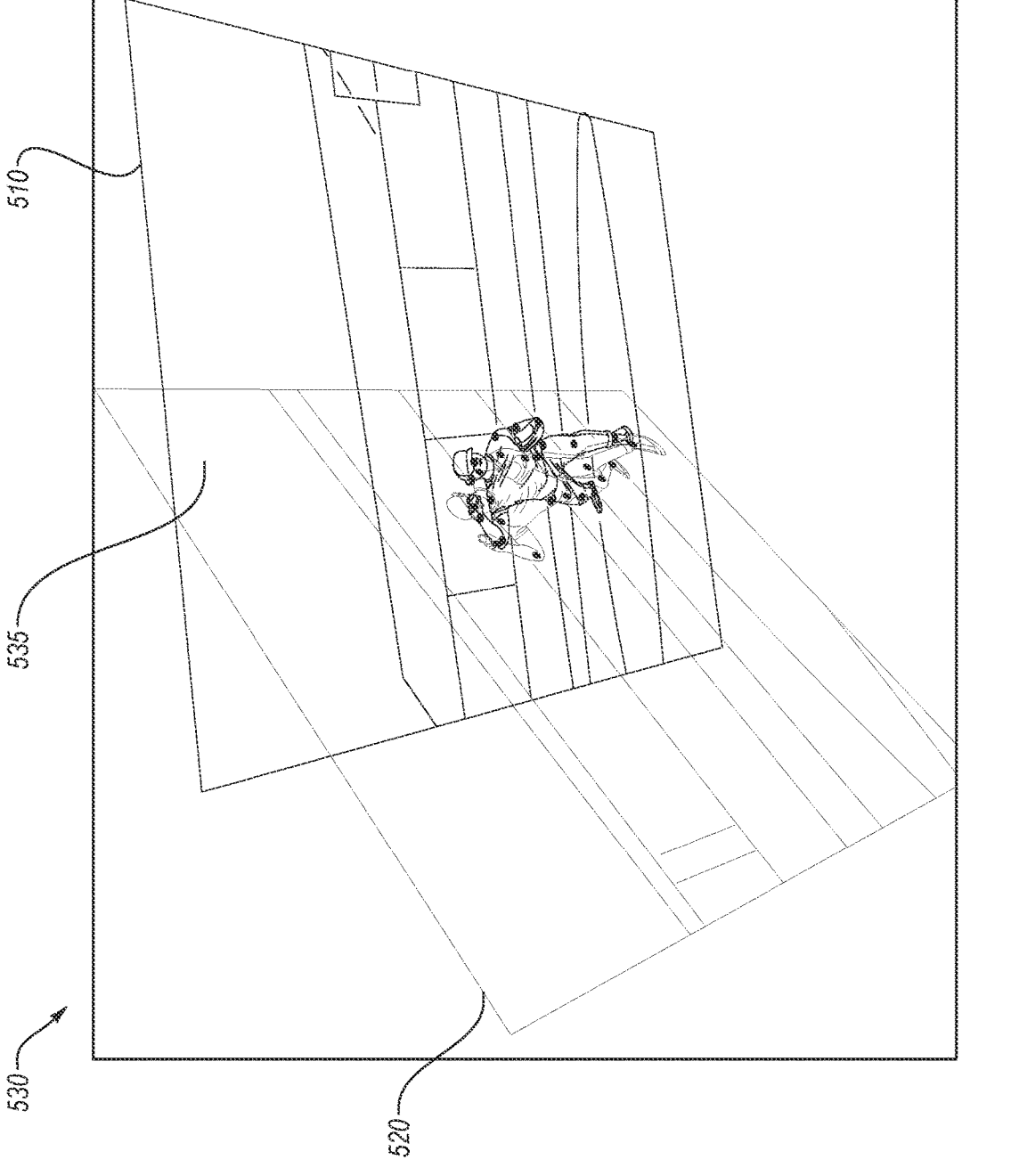
FIG. 5D illustrates a top-down view of the intersection of the first frame and the second frame according to one or more embodiments of the present disclosure.

In some embodiments, the 3D features may be used to determine whether a first 3D key points heatmap 134 depicts the environment at the same time or at a similar time within a threshold level of similarity as a second 3D key points heatmap 134. Determining whether the 3D key points heatmaps 134 represent the same or similar times may involve computing 3D intersection over union (IoU) values for one or more pairs of 3D key points heatmaps 134. For example, FIG. 5C illustrates a front view and FIG. 5D illustrates a top-down view of an intersectional view 530 of the first frame 510 and the second frame 520 according to one or more embodiments of the present disclosure. The intersectional view 530 of the first frame 510 and the second frame 520 may involve rotating and overlaying one or more of the first frame 510 and the second frame 520 for an intersection region 535 between the two frames. In some embodiments, as shown in FIG. 5D, the first frame 510 and the second frame 520 intersect and form an angle that is substantially similar to the angle formed between the first camera, the second camera and the object.

The IoU values corresponding to the first frame 510 and the second frame 520 may be computed according to a degree of overlap between the 3D key points heatmaps 134 corresponding to each frame included in the intersection region 535. In some embodiments, the IoU values may be scalar values or normalized scalar values. In some embodiments, the scalar values or the normalized scalar values may be from zero to one. The IoU values may be computed with respect to two spaces represented by bounding boxes, such as three-dimensional heatmaps represented by the first frame 510 and the second frame 520. A given bounding box may be represented as a matrix having dimensionality based on the given bounding box. For example, a three-dimensional heatmap may include three dimensions in which each dimension includes one or more elements (e.g., a 10×10×20 matrix). The values of the elements included in the matrix may represent an approximation of a section or other aspect of the three-dimensional heatmap to a key point. A value closer to one may represent a closer approximation to a key point, while a value closer to zero may represent a weaker approximation to the key point.

The IoU values may be computed as an overlap between two or more matrices respectively corresponding to two or more bounding boxes. For example, the IoU value may be a dot product computed between two three-dimensional matrices. In these and other embodiments, the three-dimensional matrices may represent frames corresponding to particular cameras. For example, a first three-dimensional matrix may represent a first frame corresponding to a first camera, and a second three-dimensional matrix may represent a fifth frame corresponding to a third camera included in an environment having multiple cameras.

In some embodiments, the overlap between the two or more three-dimensional matrices may be anchored according to a base point that represents a recognizable feature related to the overlapped three-dimensional matrices. For example, the base point may be a home plate in a baseball field captured by two or more cameras. As an additional or alternative example, the base point may be a field marking included in a given environment that is included in images captured by two or more cameras. In these and other embodiments, the base point may be identified by a machine-learning system, such as a deep neural network, that identifies one or more points that are the most likely to be successful key points.

The motion analysis system 140 may be configured to compute a time delay 142 between the first camera that captured the image associated with the overlapped first frame 510 and the second camera that captured the image associated with the overlapped second frame 520. In some embodiments, computing the time delay 142 may be facilitated by implementing a neural network, such as a neural network 640 as illustrated in relation to an operating environment 600 of FIG. 6. In some embodiments, the neural network 640 may be implemented as part of the 3D heatmap system 130, the motion analysis system 140, or any other component of the system 100. The neural network 640 may obtain 2D object pose models 610, which may be the same as or similar to the 2D object pose models 125 described in relation to FIG. 1; 3D ground truth features 620, which may be the same as or similar to the 3D ground truth features 132 described in relation to FIG. 1; and intrinsic and extrinsic camera parameters 630. The neural network 640 may be trained to output one or more overlapped 3D key points heatmaps 650 that may be the same as or similar to the 3D key points heatmaps 134 described in relation to FIG. 1 based on the 2D object pose models 610, the 3D ground truth features 620, and the intrinsic and extrinsic camera parameters 630.

Figure 6:
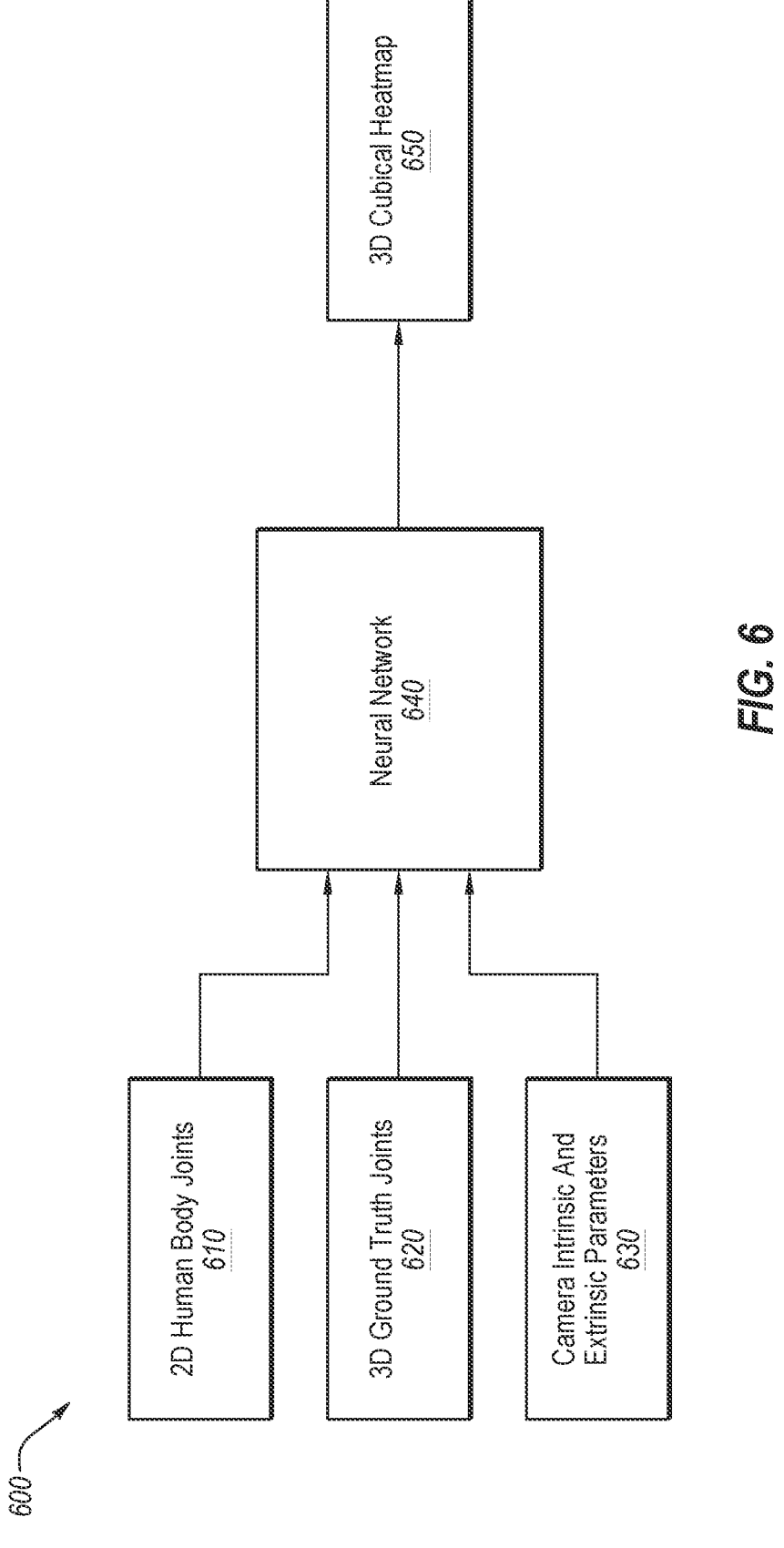
FIG. 6 illustrates a neural network that may be implemented with the body motion reconstruction system according to one or more embodiments of the present disclosure.
Figure 7A:
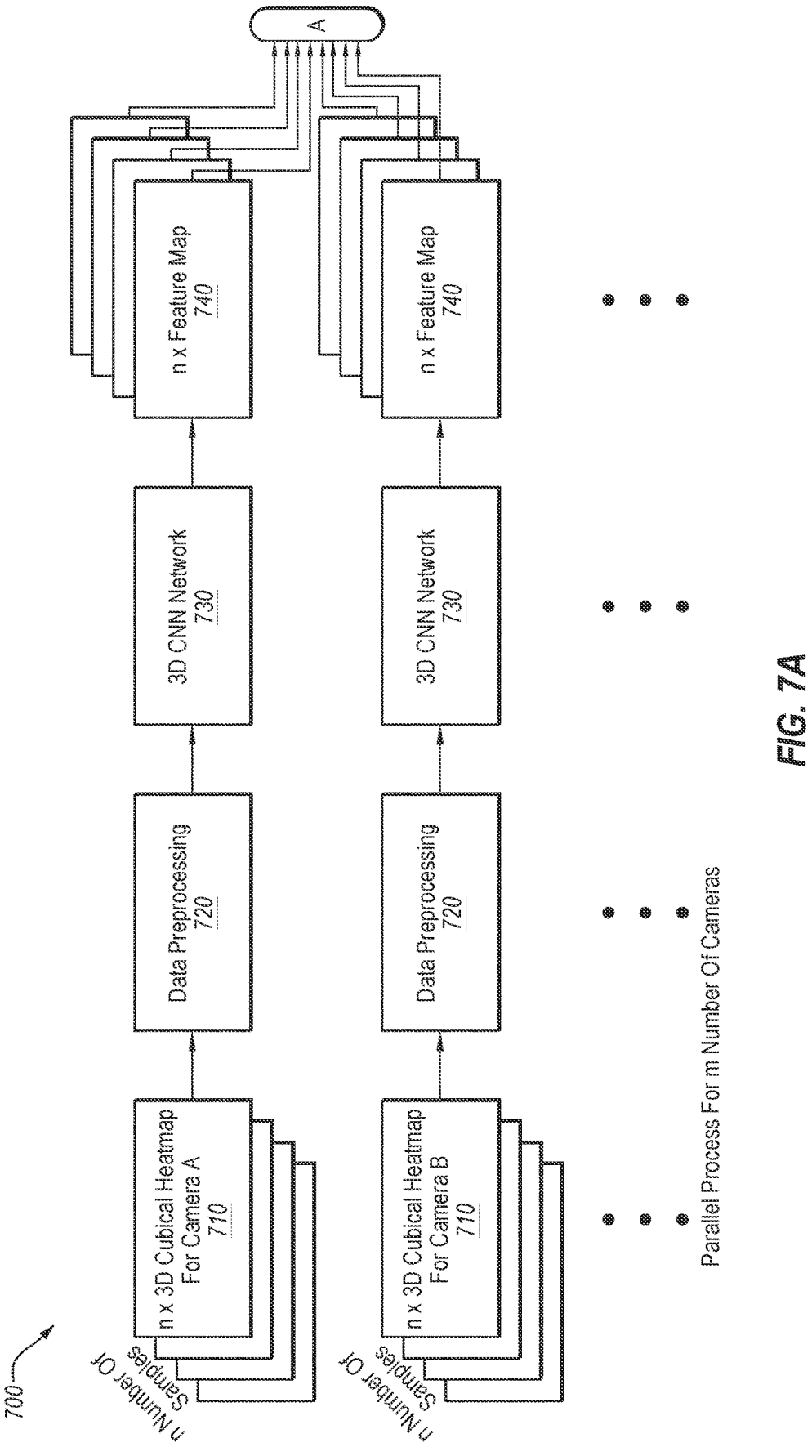
FIGS. 7A-7B illustrate a neural network pipeline that corresponds to training of a neural network configured to reconstruct body motion according to one or more embodiments of the present disclosure.
Figure 7B:
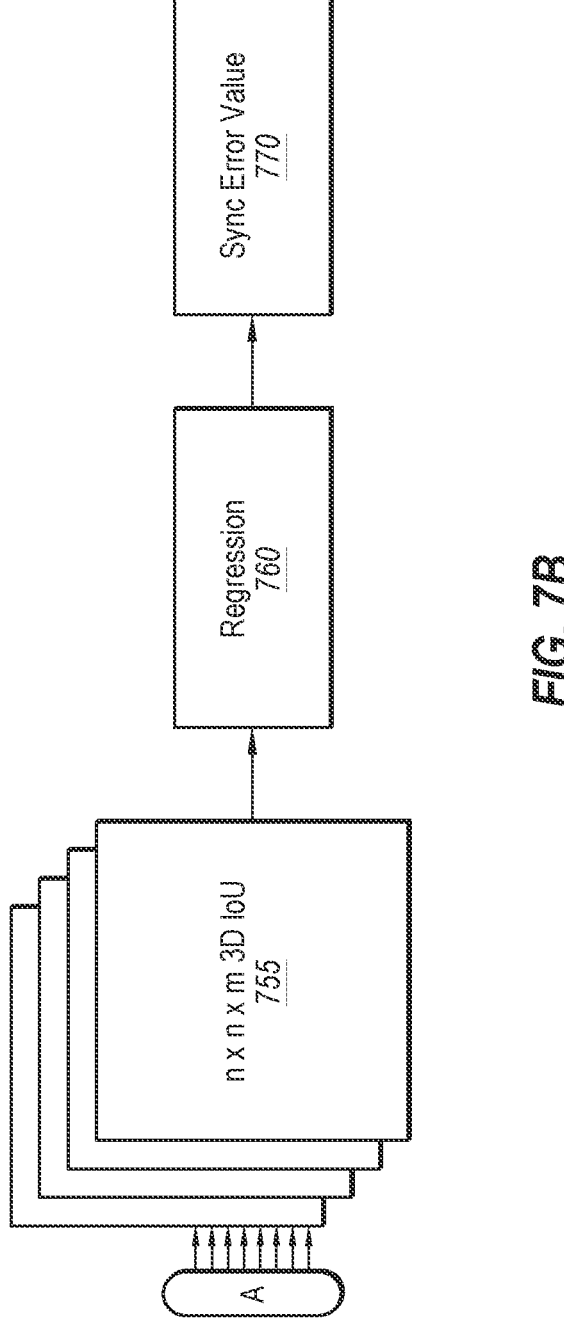

Operations of the operating environment 600 are represented in FIGS. 7A-7B, which illustrates a neural network pipeline 700 that corresponds to, for example, training of the neural network 640 of the operating environment 600 described in relation to FIG. 6 according to one or more embodiments of the present disclosure. The neural network pipeline 700 may correspond to a multi-camera system that includes a first number of cameras, m, with each camera included in the multi-camera system being configured to capture a second number of 3D cubical heatmaps 710, n. Operations of the neural network pipeline 700 may correspond to operations of a computer system, such as the system 100 described in relation to FIG. 1.

A given 3D cubical heatmap 710 may include a three-dimensional point cloud in which one or more of the points included in the point cloud have confidence parameters indicating Euclidean distances between the one or more points and a nearest feature point included in the point cloud. For example, the given 3D cubical heatmap 710 may represent a human body, and a given point proximate to a shoulder joint of the human body may include a line indicating the Euclidean distance between the given point and one or more feature points that represent the shoulder joint. In this and other examples, the lines indicating the Euclidean distances between points and feature points may include different colors, thicknesses, stippling densities, or any other characteristics that represent differing degrees of confidence in the indicated Euclidean distances.

The 3D cubical heatmaps 710 may be obtained by a data preprocessing module 720 that is configured to narrow or expand a three-dimensional bounding box size corresponding to each of the 3D cubical heatmaps 710. In other words, the data preprocessing module 720 may be configured to identify regions that are more likely to be relevant for motion analysis of an object included in the 3D cubical heatmaps 710. In some embodiments, the preprocessing of the 3D cubical heatmaps 710 may involve comparing the 3D cubical heatmaps 710 to one or more ground truth heatmaps that represent the same or a similar object as the object included in the 3D cubical heatmaps 710.

Generating the ground truth heatmaps may involve prior work relating to the object-of-interest in which the object-of-interest and motion of the object-of-interest are observed and measured in a motion capture laboratory environment. The motion capture laboratory environment may include, for example, highly accurate and well-calibrated cameras that are configured to capture images of the object-of-interest and activity sensor nodes that are configured to precisely measure three-dimensional locations of feature points. Generating the ground truth heatmaps may involve establishing the Euclidean distances between the established feature points and relating the feature points to particular locations relevant to the object-of-interest. In some embodiments, the activity sensor nodes may collectively include a static reference position, such as an origin point, and distance changes between each of the activity sensor nodes and the static reference position may indicate the locations of the feature points. Merging the image data captured by the highly precise cameras and the distance information captured by the activity sensor nodes results in both the two-dimensional positions and the three-dimensional positions of the feature points.

A 3D convolutional neural network ("CNN") 730 that may be the same as or similar to the neural network 640 of the operating environment 600 described in relation to FIG. 6 may be configured to obtain the preprocessed 3D cubical heatmaps 710. The 3D CNN 730 may extract temporal and spatial features and output feature maps 740 that correspond to each of the 3D cubical heatmaps 710. The feature maps 740 may be obtained by an IoU calculation module 750 that is configured to temporally or spatially shift a first feature map based on the feature maps 740 corresponding to the other cameras and output a corresponding number of 3D IoU values 755. Given m number of cameras in the multi-camera system in which each camera captures n images, the number of 3D IoU values 755 outputted by the IoU calculation module 750 may be n×n×m.

A regression module 760 may select the greatest 3D IoU values 755 and the feature maps 740 that correspond to the selected 3D IoU values 755 to determine synchronization shift values 770 between the cameras. In some embodiments, the regression module 760 may select the single maximum 3D IoU value 755 between each of the cameras. Additionally or alternatively, the regression module 760 may select multiple 3D IoU values 755 according to a percentile cutoff, a fixed number of 3D IoU values 755, or any other selection criteria. In some embodiments, the regression module 760 may select any of the 3D IoU values 755 less than the greatest 3D IoU values. In some embodiments, the regression module 760 may opt to not select the greatest 3D IoU values 755 to decrease the possibility of encountering failures related to outlier 3D IoU values. For example, in a two-frame synchronization difference between two cameras, 3D IoU values for these two cameras may be taken in pairs such as camera 1-frame 1 and camera 2-frame 3; camera 1-frame 2 and camera 2-frame 4; camera 1-frame 198 and camera 2-frame 200; or any other combinations of cameras and frames. In some embodiments, the regression module 760 may select the 3D IoU values by considering the entire sequence of 3D IoU values. In such an embodiment, it is understood that even if the greatest 3D IoU values are found in some sequence of 3D IoU values, the regression module 760 may select the 3D IoU values by considering the entire sequence of 3D IoU values instead of specific 3D IoU values. In these and other embodiments, the synchronization shift value 770 between any two cameras may represent the time delay between the two cameras.

Elements of the neural network pipeline 700, including, for example, the data preprocessing module 720, the 3D CNN module, the IoU calculation module 750, and the regression module 760, (generally referred to as "computing modules"), may include code and routines configured to enable a computing system to perform one or more operations. Additionally or alternatively, the computing modules may be implemented using hardware including a processor, a microprocessor (e.g., to perform or control performance of one or more operations), a field-programmable gate array (FPGA), or an application-specific integrated circuit (ASIC). In some other instances, the computing modules may be implemented using a combination of hardware and software. In the present disclosure, operations described as being performed by the computing modules may include operations that the computing modules may direct one or more corresponding systems to perform. The computing modules may be configured to perform a series of operations with respect to the 3D cubical heatmaps 710, the feature maps 740, the 3D IoU values 755, or the synchronization shift values 770 as described above.

Modifications, additions, or omissions may be made to the neural network pipeline 700 without departing from the scope of the present disclosure. For example, the designations of different elements in the manner described is meant to help explain concepts described herein and is not limiting. Further, the neural network pipeline 700 may include any number of other elements or may be implemented within other systems or contexts than those described.

In some embodiments, the time delay 142 may indicate a difference in when image capturing was initiated between a first camera and a second camera. For example, the motion analysis system 140 may output a given time delay 142 of 2.5 frames with respect to a given first camera that captures images at two hundred fps and a given second camera that captures images at one hundred fps. Assuming the given first camera captures a single frame every five microseconds (ms), the motion analysis system 140 may compute the given time delay 142 to be 12.5 ms.

The motion analysis system 140 may generate the motion journal 144 based on the 3D key points heatmaps 134 and the time delays 142 associated with the corresponding camera system 110. The motion journal 144 may include a compilation of the 3D coordinates, such as an <x, y, z> Cartesian coordinate system, associated with the 3D key points heatmaps 134 with consideration for the time delays 142 corresponding to the camera system 110. In other words, the motion journal 144 may specify a 3D coordinate corresponding to each feature identified as being relevant to the object-of-interest in a chronological sequence in which the chronology of the motion journal 144 may be determined based on the time delays 142.

Since the motion journal 144 may indicate a sequence of motions and a speed at which the motions were performed, motion patterns corresponding to special events included in the motion journal 144 may be identified. Turning to FIGS. 4A-4C, for example, one or more motion patterns related to the first pose 410, the second pose 420, or the third pose 430 documented in the motion journal 144 may be identified as corresponding to special events. For example, a given sequence of 3D coordinates corresponding to the first joints 414 and the first object 412 associated with the first pose 410 may indicate a pattern of motion associated with a foot plant typically seen in baseball games before a pitcher throws a baseball. As an additional or alternative example, a given sequence of 3D coordinates corresponding to the second joints 424 and the second object 422 associated with the second pose 420 may indicate a pattern of motion associated with a ball release motion typically seen in baseball games immediately before the pitcher throws the baseball. As an additional or alternative example, a given sequence of 3D coordinates corresponding to the third joints 434 and the third object 432 associated with the third pose 430 may indicate a pattern of motion associated with a follow-through motion typically seen in baseball games after the pitcher has thrown the baseball.

Modifications, additions, or omissions may be made to the system 100 without departing from the scope of the present disclosure. For example, the designations of different elements in the manner described is meant to help explain concepts described herein and is not limiting. Further, the system 100 may include any number of other elements or may be implemented within other systems or contexts than those described.

FIG. 8 is a flowchart of an example method of generating a motion journal analyzing a moving object according to at least one embodiment of the present disclosure. The method 800 may be performed by any suitable system, apparatus, or device. For example, one or more computer systems or software modules corresponding to the camera system 110, the 2D body motion reconstruction system 120, the 3D heatmap system 130, or the motion analysis system 140 of FIG. 1 may perform one or more operations associated with the method 800. Although illustrated with discrete blocks, the steps and operations associated with one or more of the blocks of the method 800 may be divided into additional blocks, combined into fewer blocks, or eliminated, depending on the particular implementation.

The method 800 may begin at block 802, where first image data and second image data of an object motion are collected. In some embodiments, the first image data may include one or more first frames of image data captured by a first camera, and the second image data may include one or more second frames of image data captured by a second camera. The first camera and the second camera may be configured to capture image data corresponding to the same given environment, which may or may not result in the first camera and the second camera capturing image data of the same or similar sections of the given environment or the same or similar objects included in the given environment. In some embodiments, the first camera and the second camera may be temporally coordinated such that the first camera and the second camera capture image data at the same time. Additionally or alternatively, the first camera and the second camera may be desynchronized such that the first image data is captured starting at a first time, and the second image data is captured starting at a second time. In some embodiments, the first camera and the second camera may be configured to capture image data at the different frame rate. For example, the first camera is configured to capture image data at a first frame rate of one hundred fps, while the second camera is configured to capture image data at a second frame rate of two hundred fps. In this and other examples, the number of frames included in the first image data may differ from the number of frames included in the second image data.

At block 804, an object included in each first frame and each second frame may be identified. In some embodiments, identification of the object in the first frames and the second frames of image data may involve using a machine-learning process that is trained to perform object identification based on inputted 2D images. In these and other embodiments, the identified object may include one or more discrete objects in the given environment. For example, the identified object may include one or more balls used in a sports game or one or more pieces of equipment used in the sports game. Additionally or alternatively, the identified object may include a human in the given environment or any objects associated with the human. For example, the identified object may include an arm of the human, a nose of the human, a shoulder of the human, or any other body part associated with the human.

At block 806, a 2D pose estimation of the object may be modeled for each of the identified frames. A given 2D pose estimation may include a 2D section of respective given image, such as one or more of the ROIs associated with the respective given image. In some embodiments, the given 2D pose estimation may include one or more features corresponding to the identified object that corresponds to the given 2D pose estimation. For example, the given 2D pose estimation may include features such as the head feature 310, the right wrist joint feature 320, the right elbow joint feature 330, or any of the other features as depicted in the human body model 300 of FIG. 3.

At block 808, 3D joint heatmaps corresponding to the object may be generated. In some embodiments, the 3D joint heatmaps may indicate a probability of a given feature included in the 2D pose estimation of the object being present in a 3D region of the given environment. For example, a given 3D joint heatmap may include one or more colors near the head of a human captured in a given image in which each of the colors indicates a different probability of representing a nose associated with the human. In these and other embodiments, a first 3D joint heatmap corresponding to the first camera and the first frames of image data and a second 3D joint heatmap corresponding to the second camera and the second frames of image data may be generated.

At block 810, a time delay between the first camera and the second camera may be determined. The time delay may indicate a quantitative difference between an image-capturing framerate corresponding to the first camera and an image-capturing framerate corresponding to the second camera as described in relation to the time delay 142 described in relation to FIG. 1. In some embodiments, the time delay may be determined based on the first 3D joint heatmap corresponding to the first camera and the second 3D joint heatmap corresponding to the second camera.

At block 812, a motion journal associated with the object may be generated. In some embodiments, the motion journal may be the same as or similar to the motion journal 144 described in relation to FIG. 1. In some embodiments, the motion journal may be used to summarize the object motion associated with a given object identified in the first frames of image data and the second frames of image data based on the determined time delay. In these and other embodiments, motion patterns corresponding to special motion events may be identified by analyzing the information included in the motion journal.

Modifications, additions, or omissions may be made to the method 800 without departing from the scope of the disclosure. For example, the designations of different elements in the manner described is meant to help explain concepts described herein and is not limiting. Further, the method 800 may include any number of other elements or may be implemented within other systems or contexts than those described.

Figure 9:
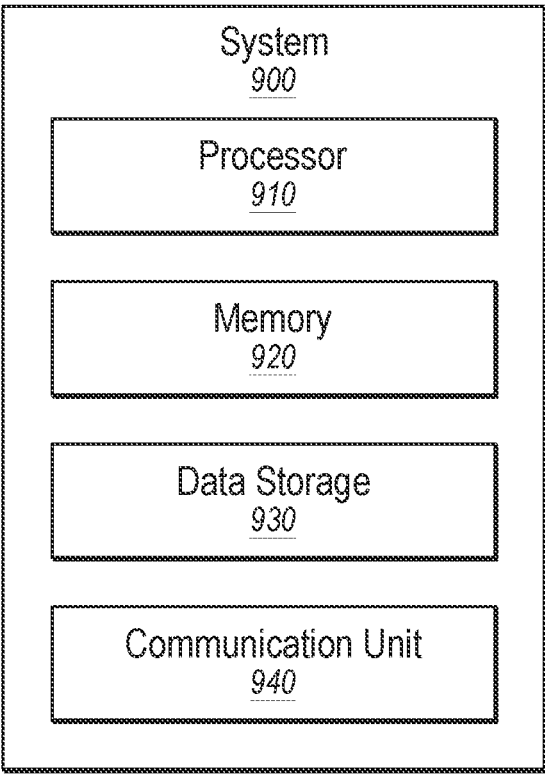
FIG. 9 is an example computer system according to one or more embodiments of the present disclosure.

FIG. 9 is an example computer system 900, according to at least one embodiment described in the present disclosure. The computing system 900 may include a processor 910, a memory 920, a data storage 930, and/or a communication unit 940, which all may be communicatively coupled. Any or all of the camera system 110, the 2D body motion reconstruction system 120, the 3D heatmap system 130, or the motion analysis system 140 of FIG. 1 may be implemented as a computing system consistent with the computing system 900.

Generally, the processor 910 may include any suitable special-purpose or general-purpose computer, computing entity, or processing device including various computer hardware or software modules and may be configured to execute instructions stored on any applicable computer-readable storage media. For example, the processor 910 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 10, it is understood that the processor 910 may include any number of processors distributed across any number of network or physical locations that are configured to perform individually or collectively any number of operations described in the present disclosure. In some embodiments, the processor 910 may interpret and/or execute program instructions and/or or process data stored in the memory 920, the data storage 930, or the memory 920 and the data storage 930. In some embodiments, the processor 910 may fetch program instructions from the data storage 930 and load the program instructions into the memory 920.

After the program instructions are loaded into the memory 920, the processor 910 may execute the program instructions, such as instructions to cause the computing system 900 to perform the operations of the method 800 of FIG. 8. For example, the computing system 900 may be instructed to collect the first image data and the second image data of an object motion, identify an object included in each first frame and each second frame, model a 2D pose estimation of the object for each of the identified frames, generate 3D joint heatmaps corresponding to the object, determine a time delay between the first camera and the second camera, or generate a motion journal associated with the object.

The memory 920 and the data storage 930 may include computer-readable storage media or one or more computer-readable storage mediums for having computer-executable instructions or data structures stored thereon. Such computer-readable storage media may be any available media that may be accessed by a general-purpose or special-purpose computer, such as the processor 910. For example, the memory 920 and/or the data storage 930 may include the captured images 115, the 2D object pose model 125, the 3D ground truth features 132, the 3D key points heatmaps 134, the time delays 142, or the motion journal 144 as described in relation to FIG. 1. In some embodiments, the computing system 900 may or may not include either of the memory 920 and the data storage 930.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 910 to perform a particular operation or group of operations.

The communication unit 940 may include any component, device, system, or combination thereof that is configured to transmit or receive information over a network. In some embodiments, the communication unit 940 may communicate with other devices at other locations, the same location, or even other components within the same system. For example, the communication unit 940 may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit 940 may permit data to be exchanged with a network and/or any other devices or systems described in the present disclosure. For example, the communication unit 940 may allow the system 900 to communicate with other systems, such as computing devices and/or other networks.

One skilled in the art, after reviewing this disclosure, may recognize that modifications, additions, or omissions may be made to the system 900 without departing from the scope of the present disclosure. For example, the system 900 may include more or fewer components than those explicitly illustrated and described.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, it may be recognized that changes may be made in form and detail without departing from the scope of the present disclosure. Thus, the present disclosure is limited only by the claims.

In some embodiments, the different components, modules, engines, and services described herein may be implemented as objects or processes that execute on a computing system (e.g., as separate threads). While some of the systems and processes described herein are generally described as being implemented in software (stored on and/or executed by general purpose hardware), specific hardware implementations or a combination of software and specific hardware implementations are also possible and contemplated.

Terms used in the present disclosure and especially in the appended claims (e.g., bodies of the appended claims) are generally intended as "open terms" (e.g., the term "including" should be interpreted as "including, but not limited to.").

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is expressly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase preceding two or more alternative terms, whether in the description, claims, or drawings, should be understood to contemplate the possibilities of including one of the terms, either of the terms, or both of the terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method, comprising:

collecting first image data and second image data of an object motion, the first image data including a plurality of first frames captured by a first camera and the second image data including a plurality of second frames captured by a second camera;

identifying an object in each first frame of the plurality of first frames and each second frame of the plurality of second frames;

modeling two-dimensional pose estimations of the object identified in each of the first frames and each of the second frames, the two-dimensional pose estimations indicating coordinate positions of one or more features of the object that contribute to the object motion;

generating a first three-dimensional joint heatmap corresponding to the object identified in the plurality of first frames and a second three-dimensional joint heatmap corresponding to the object identified in the plurality of second frames, wherein the first and second three-dimensional joint heatmaps are generated from the features indicated in the two-dimensional pose estimations;

determining a time delay between the first camera and the second camera based on the first three-dimensional joint heatmap and the second three-dimensional joint heatmap; and generating a motion journal that summarizes the object motion associated with the object identified in the plurality of first frames and the plurality of second frames based on the time delay.

2. The method of claim 1, wherein the time delay between the first camera and the second camera is determined by a neural network that is configured to:

generate a three-dimensional bounding box in which a volume included in the three-dimensional bounding box represents a region relevant for motion analysis;

extract temporal features and spatial features corresponding to the first three-dimensional joint heatmap and the second three-dimensional joint heatmap within the three-dimensional bounding box;

shift the first three-dimensional joint heatmap relative to the second three-dimensional joint heatmap to align the spatial features extracted from both the first and the second three-dimensional joint heatmaps; and compute the time delay based on shifting of the extracted temporal features.

3. The method of claim 2, wherein shifting the first three-dimensional joint heatmap relative to the second three-dimensional joint heatmap includes calculating three-dimensional intersection over union (IoU) values between the first three-dimensional joint heatmap and the second three-dimensional joint heatmap.

4. The method of claim 3, wherein the IoU values are scalar values ranging from zero to one computed according to a dot product between a first matrix representing the first three-dimensional joint heatmap and a second matrix representing the second three-dimensional joint heatmap.

5. The method of claim 4, wherein the time delay is computed based on an IoU value between the first three-dimensional joint heatmap and the second three-dimensional joint heatmap.

6. The method of claim 1, wherein the one or more features of the object that contribute to the object motion are identified based on location differences of the one or more features between two or more frames of the first plurality of frames or of the second plurality of frames and distances between the one or more features remaining constant between the two or more frames.

7. The method of claim 1, wherein the first camera has a first frame capture rate and the second camera has a second frame capture rate that is less than the first frame capture rate.

8. The method of claim 6, further comprising oversampling the second camera with respect to the first camera, the oversampling of the second camera resulting in a number of frames captured by the second camera being within a threshold value of the number of frames captured by the first camera in a same period of time.

9. The method of claim 1, further comprising analyzing the motion journal to identify a pattern associated with the object motion.

10. The method of claim 1, wherein the object is a human body and the first three-dimensional joint heatmap and the second three-dimensional joint heatmap relate to joints associated with the human body.

11. A system, comprising:

one or more processors;

one or more non-transitory computer-readable storage media configured to store instructions that, in response to being executed, cause the system to perform operations, the operations comprising:

collecting first image data and second image data of an object motion, the first image data including a plurality of first frames captured by a first camera and the second image data including a plurality of second frames captured by a second camera;

identifying an object in each first frame of the plurality of first frames and each second frame of the plurality of second frames;

modeling two-dimensional pose estimations of the object identified in each of the first frames and each of the second frames, the two-dimensional pose estimations indicating coordinate positions of one or more features of the object that contribute to the object motion;

generating a first three-dimensional joint heatmap corresponding to the object identified in the plurality of first frames and a second three-dimensional joint heatmap corresponding to the object identified in the plurality of second frames, wherein the first and second three-dimensional joint heatmaps are generated from the features indicated in the two-dimensional pose estimations;

determining a time delay between the first camera and the second camera based on the first three-dimensional joint heatmap and the second three-dimensional joint heatmap; and generating a motion journal that summarizes the object motion associated with the object identified in the plurality of first frames and the plurality of second frames based on the time delay.

12. The system of claim 11, wherein the time delay between the first camera and the second camera is determined by a neural network that is configured to:

generate a three-dimensional bounding box in which a volume included in the three-dimensional bounding box represents a region relevant for motion analysis;

extract temporal features and spatial features corresponding to the first three-dimensional joint heatmap and the second three-dimensional joint heatmap within the three-dimensional bounding box;

shift the first three-dimensional joint heatmap relative to the second three-dimensional joint heatmap to align the spatial features extracted from both the first and the second three-dimensional joint heatmaps; and compute the time delay based on shifting of the extracted temporal features.

13. The system of claim 12, wherein shifting the first three-dimensional joint heatmap relative to the second three-dimensional joint heatmap includes calculating three-dimensional intersection over union (IoU) values between the first three-dimensional joint heatmap and the second three-dimensional joint heatmap.

14. The system of claim 13, wherein the IoU values are scalar values ranging from zero to one computed according to a dot product between a first matrix representing the first three-dimensional joint heatmap and a second matrix representing the second three-dimensional joint heatmap.

15. The system of claim 14, wherein the time delay is computed based on a IoU value between the first three-dimensional joint heatmap and the second three-dimensional joint heatmap.

16. The system of claim 11, wherein the one or more features of the object that contribute to the object motion are identified based on location differences of the one or more features between two or more frames of the first plurality of frames or of the second plurality of frames and distances between the one or more features remaining constant between the two or more frames.

17. The system of claim 11, wherein the first camera has a first frame capture rate and the second camera has a second frame capture rate that is less than the first frame capture rate.

18. The system of claim 16, further comprising oversampling the second camera with respect to the first camera, the oversampling of the second camera resulting in a number of frames captured by the second camera being within a threshold value of the number of frames captured by the first camera in a same period of time.

19. The system of claim 11, further comprising analyzing the motion journal to identify a pattern associated with the object motion.

20. The system of claim 11, wherein the object is a human body and the first three-dimensional joint heatmap and the second three-dimensional joint heatmap relate to joints associated with the human body.

* * * * *